(12) United States Patent
Daio et al.

(10) Patent No.: US 12,313,591 B2
(45) Date of Patent: May 27, 2025

(54) DETECTOR

(71) Applicant: Sharp Display Technology Corporation, Kameyama (JP)

(72) Inventors: Manabu Daio, Kameyama (JP); Tomohiro Kosaka, Kameyama (JP); Kei Ikuta, Kameyama (JP); Yuuki Ootsuka, Kameyama (JP); Reshan Maduka Abeysinghe, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 178 days.

(21) Appl. No.: 18/224,634

(22) Filed: Jul. 21, 2023

(65) Prior Publication Data

US 2024/0036002 A1 Feb. 1, 2024

(30) Foreign Application Priority Data

Jul. 26, 2022 (JP) ................................. 2022-118867

(51) Int. Cl.
G01N 27/624 (2021.01)

(52) U.S. Cl.
CPC .................................. *G01N 27/624* (2013.01)

(58) Field of Classification Search
CPC ........................... G01N 27/624; H01J 49/0018
See application file for complete search history.

(56) References Cited

U.S. PATENT DOCUMENTS

| | | | |
|---|---|---|---|
| 6,495,823 B1 | 12/2002 | Miller et al. |
| 6,512,224 B1 | 1/2003 | Miller et al. |
| 6,815,669 B1 | 11/2004 | Miller et al. |
| 7,098,449 B1 | 8/2006 | Miller et al. |
| 7,122,794 B1 | 10/2006 | Miller et al. |
| 2001/0030285 A1 | 10/2001 | Miller et al. |
| 2003/0052263 A1 | 3/2003 | Kaufman et al. |
| 2003/0132380 A1 | 7/2003 | Miller et al. |
| 2003/0146377 A1 | 8/2003 | Miller et al. |
| 2004/0094704 A1 | 5/2004 | Miller et al. |

(Continued)

FOREIGN PATENT DOCUMENTS

| | | | |
|---|---|---|---|
| JP | 5015395 B2 | 8/2012 |
| JP | 5914657 B2 | 5/2016 |

(Continued)

*Primary Examiner* — Christopher E Mahoney
(74) *Attorney, Agent, or Firm* — ScienBiziP, P.C.

(57) ABSTRACT

A detector includes a first electrode, second electrodes forming a flow path for charged particles between the first electrode and the second electrodes, third electrodes configured to collect the charged particles, and a fourth electrode having a sheet resistance higher than sheet resistances of the second electrodes. The fourth electrode has one end portion having a first potential in a third direction and another end portion having a second potential lower than the first potential in the third direction, the fifth electrode included in the second electrodes is connected to the fourth electrode, the sixth electrode included in the second electrodes is connected to the fourth electrode, a seventh electrode included in the third electrodes is arranged side by side with the fifth electrode along a first direction, and an eighth electrode included in the third electrodes is arranged side by side with the sixth electrode along the first direction.

7 Claims, 14 Drawing Sheets

(56) References Cited

U.S. PATENT DOCUMENTS

| | | |
|---|---|---|
| 2004/0124350 A1 | 7/2004 | Miller et al. |
| 2004/0240843 A1 | 12/2004 | Miller et al. |
| 2005/0017163 A1 | 1/2005 | Miller et al. |
| 2005/0023457 A1 | 2/2005 | Miller et al. |
| 2005/0029443 A1 | 2/2005 | Miller et al. |
| 2005/0029449 A1 | 2/2005 | Miller et al. |
| 2005/0040330 A1 | 2/2005 | Kaufman et al. |
| 2005/0051719 A1 | 3/2005 | Miller et al. |
| 2005/0133716 A1 | 6/2005 | Miller et al. |
| 2005/0139762 A1 | 6/2005 | Miller et al. |
| 2005/0145789 A1 | 7/2005 | Miller et al. |
| 2005/0156107 A1 | 7/2005 | Miller et al. |
| 2005/0173629 A1 | 8/2005 | Miller et al. |
| 2005/0253061 A1 | 11/2005 | Cameron et al. |
| 2005/0258359 A1 * | 11/2005 | Guevremont ....... H01J 49/0018 250/288 |
| 2005/0263699 A1 | 12/2005 | Miller et al. |
| 2006/0060768 A1 | 3/2006 | Kaufman et al. |
| 2006/0118717 A1 | 6/2006 | Miller et al. |
| 2006/0151687 A1 | 7/2006 | Miller et al. |
| 2006/0192102 A1 | 8/2006 | Miller et al. |
| 2006/0237642 A1 | 10/2006 | Miller et al. |
| 2006/0255255 A1 | 11/2006 | Miller et al. |
| 2007/0029477 A1 | 2/2007 | Miller et al. |
| 2007/0045530 A1 | 3/2007 | Miller et al. |
| 2007/0084999 A1 | 4/2007 | Miller et al. |
| 2007/0176092 A1 | 8/2007 | Miller et al. |
| 2007/0228269 A1 | 10/2007 | Miller et al. |
| 2007/0252082 A1 | 11/2007 | Miller et al. |
| 2008/0121794 A1 | 5/2008 | Miller et al. |
| 2008/0128609 A1 | 6/2008 | Miller et al. |
| 2008/0128612 A1 | 6/2008 | Miller et al. |
| 2008/0135745 A1 | 6/2008 | Miller et al. |
| 2008/0185512 A1 | 8/2008 | Miller et al. |
| 2008/0224032 A1 | 9/2008 | Miller et al. |
| 2009/0189064 A1 | 7/2009 | Miller et al. |
| 2012/0025070 A1 | 2/2012 | Miller et al. |
| 2015/0190815 A1 | 7/2015 | Hashimoto et al. |
| 2021/0356430 A1 * | 11/2021 | Kosaka ................ G01N 27/624 |
| 2024/0071741 A1 * | 2/2024 | Makarov ............... H01J 49/009 |

FOREIGN PATENT DOCUMENTS

| | | | | |
|---|---|---|---|---|
| WO | WO-2022102172 A1 * | 5/2022 | ........... | G01N 27/624 |
| WO | WO-2022224299 A1 * | 10/2022 | ........... | G01N 27/624 |

\* cited by examiner

|     | CV1 | CV2 | CV3 | CV4 | CV5 | CV6 | CV7 | CV8 | CV9 | CV10 |
|-----|-----|-----|-----|-----|-----|-----|-----|-----|-----|------|
| DV5 | 41  | 42  | 43  | 44  | 45  | 46  | 47  | 48  | 49  | 50   |
| DV4 | 31  | 32  | 33  | 34  | 35  | 36  | 37  | 38  | 39  | 40   |
| DV3 | 21  | 22  | 23  | 24  | 25  | 26  | 27  | 28  | 29  | 30   |
| DV2 | 11  | 12  | 13  | 14  | 15  | 16  | 17  | 18  | 19  | 20   |
| DV1 | 1   | 2   | 3   | 4   | 5   | 6   | 7   | 8   | 9   | 10   |

FIG. 10A

|     | CV1 | CV2 | CV3 | CV4 | CV5 | CV6 | CV7 | CV8 | CV9 | CV10 |
|-----|-----|-----|-----|-----|-----|-----|-----|-----|-----|------|
| DV5 |     |     | 9   |     |     |     |     | 10  |     |      |
| DV4 |     |     | 7   |     |     |     |     | 8   |     |      |
| DV3 |     |     | 5   |     |     |     |     | 6   |     |      |
| DV2 |     |     | 3   |     |     |     |     | 4   |     |      |
| DV1 |     |     | 1   |     |     |     |     | 2   |     |      |

FIG. 10B

DETECTOR

CROSS-REFERENCE TO RELATED APPLICATIONS

This application claims the benefit of priority to Japanese Patent Application Number 2022-118867 filed on Jul. 26, 2022. The entire contents of the above-identified application are hereby incorporated by reference.

BACKGROUND

Technical Field

The techniques disclosed in the present specification relate to a detector.

JP 5015395 B and JP 5914657 B disclose examples of detectors for separating and detecting ions based on ion mobility. The detector disclosed in JP 5015395 B includes a pair of substrates with a space therebetween defining a flow path between the substrates between an inlet and an outlet for samples, an ion filter including a pair of filter electrodes with a space therebetween coupled to the respective substrates and placed in the flow path, and an electronic controller that controls movement of ions through the filter by applying a bias voltage and an asymmetric periodic voltage to both ends of the ion filter electrodes.

In the detector disclosed in JP 5914657 B, at least one of a pair of plate electrodes includes a first electrode portion having a first conductivity, a second electrode portion having a second conductivity, and a third electrode portion sandwiched between the first electrode portion and the second electrode portion and having a third conductivity smaller than the first conductivity and the second conductivity, and the first electrode portion, the third electrode portion, and the second electrode portion are aligned side by side so as to be perpendicular to the flow path, and a voltage control unit applies different DC voltages to the first electrode portion and the second electrode portion.

SUMMARY

In the detector disclosed in JP 5015395 B, the pair of filter electrodes is divided into five electrode pairs, and different ion species are simultaneously detected by applying different compensation bias voltages to the electrode pairs and sweeping the electrode pairs over different voltage ranges. However, problems arise, such as complexity of a circuit for applying different compensation bias voltages to individual electrode pairs.

In the detector disclosed in JP 5914657 B, a correction voltage applied to the third electrode portion, which is a portion having low conductivity, continuously changes according to a position in a direction perpendicular to the flow path. Therefore, the correction voltage that continuously changes is reflected in data measured by a detection electrode. This makes it difficult to increase resolution of the data, which is a measurement result.

The techniques described in the present specification have been made based on the circumstances described above, and an object thereof is to simplify a circuit for applying potentials and to improve resolution.

(1) A detector related to the techniques described in this specification includes a first electrode, second electrodes facing the first electrode with a space and forming a flow path for charged particles as objects to be detected between the first electrode and the second electrodes, third electrodes arranged on a downstream side in the flow path with respect to the first electrode and the second electrodes and configured to collect the charged particles, and a fourth electrode connected to the second electrodes and having a sheet resistance higher than sheet resistances of the second electrodes, in which the fourth electrode extends along a third direction intersecting a first direction that is a direction in which the charged particles flow in the flow path and orthogonal to a second direction that is a direction from the first electrode to the second electrodes, the fourth electrode includes one end portion having a first potential in the third direction and another end portion having a second potential lower than the first potential in the third direction, the second electrodes include a fifth electrode and a sixth electrode spaced apart in the third direction, the fifth electrode is connected to the fourth electrode at a position closer to the one end portion than the other end portion, the sixth electrode is connected to the fourth electrode at a position closer to the other end portion than a connection position of the fifth electrode, the third electrodes include a seventh electrode and an eighth electrode spaced apart in the third direction, the seventh electrode is arranged side by side with the fifth electrode along the first direction, and the eighth electrode is arranged side by side with the sixth electrode along the first direction.

(2) In addition to (1), in the detector, the fourth electrode may overlap the fifth electrode and the sixth electrode on a side opposite to a first electrode side.

(3) In addition to (2), in the detector, the fourth electrode may extend along the first direction, may be provided over entire lengths of the fifth electrode and the sixth electrode, and may be in contact with surfaces of the fifth electrode and the sixth electrode facing the fourth electrode over entire lengths in the first direction.

(4) In addition to (3), in the detector, the fourth electrode may be in contact with entire surfaces of the fifth electrode and the sixth electrode facing the fourth electrode.

(5) In addition to (2), the detector may further include an insulating film sandwiched between the fourth electrode and the fifth electrode and between the fourth electrode and the sixth electrode, in which the insulating film may have a first opening arranged at a position overlapping part of the fifth electrode and a second opening arranged at a position overlapping part of the sixth electrode.

(6) In addition to (5), in the detector, the fourth electrode may extend along the first direction over entire lengths of the fifth electrode and the sixth electrode, and the insulating film may have the first opening and the second opening extending along the first direction over the entire lengths of the fifth electrode and the sixth electrode.

(7) In addition to any one of (1) to (6), in the detector, the fifth electrode and the seventh electrode may have the same dimension in the third direction and may have the same center in the third direction, and the sixth electrode and the eighth electrode may have the same dimension in the third direction and may have the same center in the third direction.

According to the techniques described in the present specification, a circuit for supplying potentials can be simplified and resolution can be improved.

BRIEF DESCRIPTION OF DRAWINGS

The disclosure will be described with reference to the accompanying drawings, wherein like numbers reference like elements.

FIG. 10A is a map graph of a Comparative Example according to the first embodiment.

FIG. 10B is a map graph of an Example according to the first embodiment.

DESCRIPTION OF EMBODIMENTS

First Embodiment

A first embodiment will be described with reference to FIG. 1 to FIG. 10B. In the present embodiment, a mobility analyzer 1 (hereinafter simply referred to as "analyzer") using a field asymmetric ion mobility spectrometry (FAIMS) system is illustrated. Note that some drawings show an X-axis, a Y-axis, and a Z-axis, and directions of these axes are drawn so as to be common in all the drawings.

Figure 1:
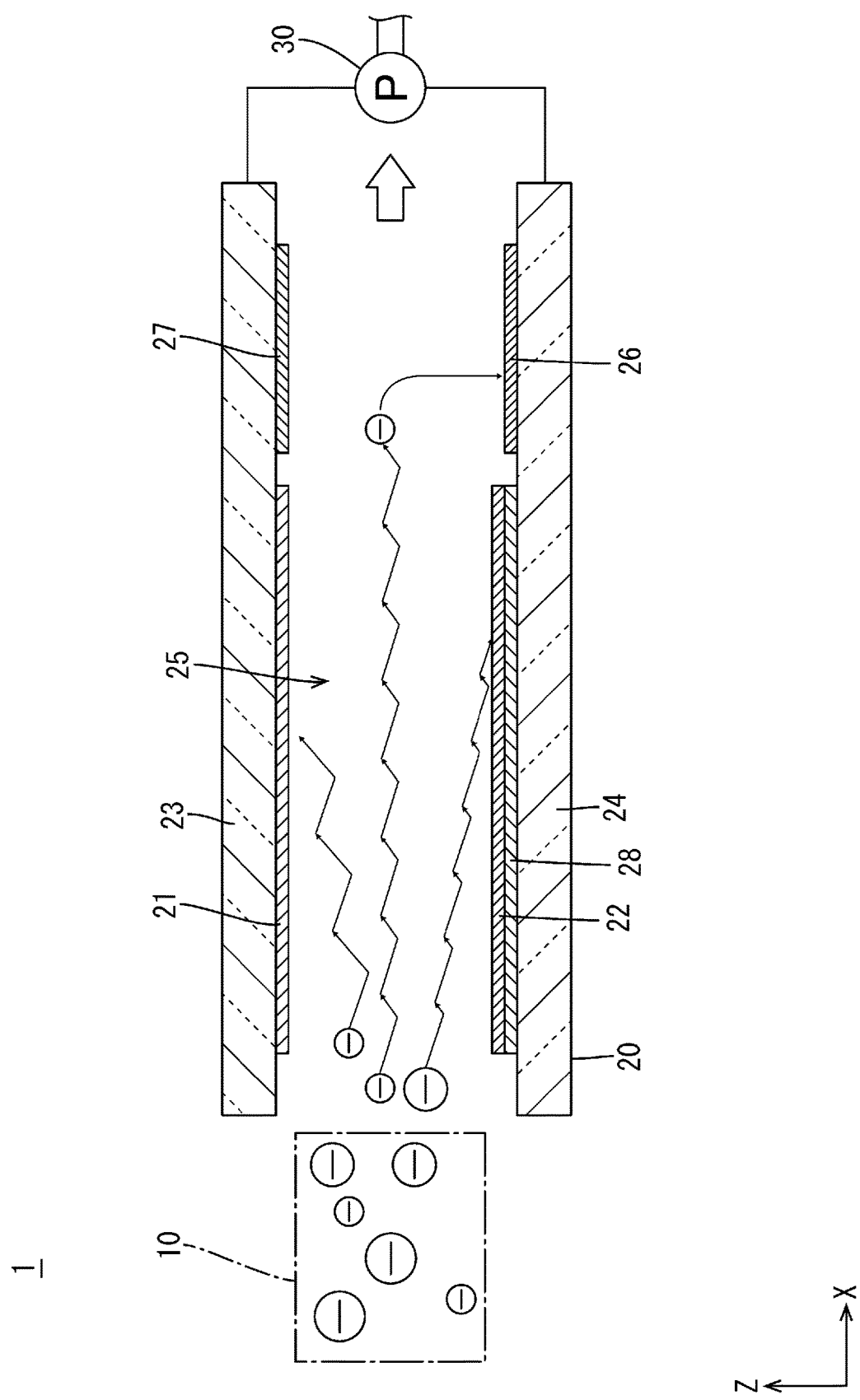
FIG. 1 is a schematic diagram illustrating a configuration of a mobility analyzer including a detection cell according to a first embodiment.
Figure 2:
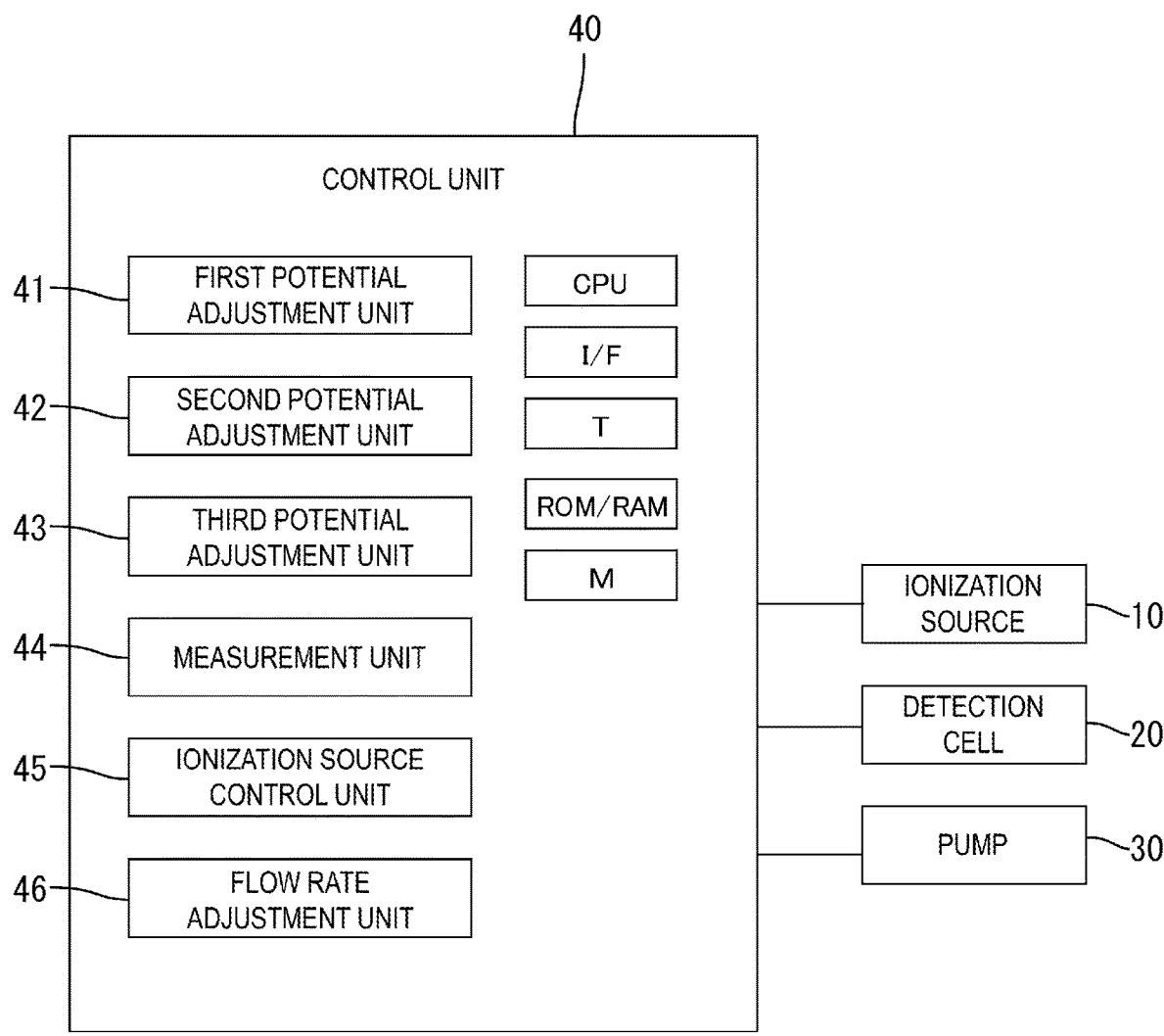
FIG. 2 is a block diagram of a control unit of the mobility analyzer according to the first embodiment.

As illustrated in FIG. 1, the analyzer 1 includes an ionization source 10, a detection cell (detector) 20, a pump 30 (an example of an air supply device), and a control unit 40 (see FIG. 2). Components are each described below.

The ionization source 10 is a device that ionizes atoms and molecules of a compound (sample) to be analyzed. When the compound is ionized by the ionization source 10, the ionized compound becomes a charged particle (sample ion) detectable in the detection cell 20. The charged particle is an object to be detected by the detector 50. An ionization method employed by the ionization source 10 is not limited, and any of various existing ionization sources can be used. To be specific, the ionization methods include, for example, an electron impact (EI) method, a chemical ionization method, a gas discharge method, a photoionization method, a desorption ionization method, an electrospray ionization (ESI) method, a thermal ionization method, an ambient ionization method, and a combination thereof. An ionization source capable of ionizing a component to be detected may be appropriately selected. In this example, although not specifically illustrated, a needle electrode is provided as the ionization source 10. The needle electrode generates a corona discharge under atmospheric pressure to generate reactive ions. The reactive ions indirectly generate charged particles by reacting with sample atoms and sample molecules. The charged particles are not limited to ions to be analyzed, but may be reactant ions, ion clusters, or the like.

Examples of the ionization source 10 include, in addition to the needle electrode described above, an ionization unit that includes a radioactive ion source containing a nickel isotope ($^{63}$Ni), an americium isotope ($^{241}$Am), or the like and ionizes a sample generated from the radioactive ion source, and an ionization unit that includes an ultraviolet pulsed laser oscillator and irradiates an ultraviolet pulsed laser beam to directly ablate and ionize a sample. The charged particles generated by the ionization source 10 are carried into the detection cell 20 by an air flow generated by supplying an atmospheric gas (neutral buffer gas), such as air or a carrier gas, by the pump 30, which will be described later.

The pump 30 is a component for moving the atmospheric gas containing the charged particles into the detection cell 20 along a flow direction. The pump 30 of the present embodiment is installed downstream of the detection cell 20 in the flow direction. As the pump 30, any of various air supply devices that can supply the charged particles generated by the ionization source 10 into the detection cell 20, which will be described later, at a predetermined speed can be used. An air supply mechanism of the pump 30 is not limited, and may be a diaphragm type, an impeller type, a piston type, a rotary vane type, another air supply device, or the like. Depending on a size or the like of the detection cell 20, as the pump 30, for example, a micro-blower with a maximum discharge pressure of about 0.03 MPa or less and an air supply rate of about 1 L/min or less can be used. For example, a micro-blower in which a diaphragm is fluctuated due to high frequency vibration (e.g., ultrasonic vibration) generated by piezoelectric ceramics is preferable as the pump 30 used in the present embodiment because it can supply air while suppressing pulsation.

The detection cell 20 is a component that separates (filters) charged particles generated by the ionization source 10 based on a difference in mobility, thereby detecting charged particles for each predetermined mobility. The detection cell 20 includes a first electrode 21, second electrodes 22, a first substrate 23 (an example of a support body), a second substrate 24 (an example of a support body), detection electrodes 26, and deflection electrodes 27. All of these elements of the detection cell 20 may be disposed in a chamber.

The first electrode 21 and the second electrodes 22 are disposed to face each other to form a pair of parallel plate filter electrodes. Main surfaces of the first electrode 21 and the second electrodes 22 facing each other are parallel. A predetermined space is kept between the first electrode 21 and the second electrodes 22. A flow path 25 for charged particles is formed between the first electrode 21 and the second electrodes 22. Hereinafter, a direction in which charged particles flow in the flow path 25 is referred to as a "first direction". The first direction can also be said to be a flow direction of charged particles. The first direction coincides with the X-axis direction in each drawing. The flow path 25 includes an ion separation space (drift space). The first electrode 21 and the second electrodes 22 of this example are respectively provided on surfaces of the first substrate 23 and the second substrate 24, which will be described later, facing each other. Hereinafter, a direction from the first electrode 21 to the second electrodes 22 is referred to as a "second direction". The second direction is a normal direction of surfaces (main surfaces) of the first electrode 21 and the second electrodes 22 facing each other. The second direction coincides with the Z-axis direction in each drawing. Hereinafter, a direction orthogonal to (intersecting with) the first direction and orthogonal to the second direction is referred to as a "third direction". The third direction coincides with the Y-axis direction in each drawing.

Shapes, sizes, and the like of the first electrode 21 and the second electrodes 22 are not limited. The first electrode 21 and the second electrodes 22 of this example each have rectangular shapes that are slightly long in the X-axis direction (first direction). Dimensions of the first electrode 21 and the second electrodes 22 along the X-axis direction are not limited to this, but may be, for example, about 0.1 cm or more (such as 1 cm or more) and about 50 cm or less (such as 10 cm or less). Thicknesses of the first electrode 21 and the second electrodes 22 are not limited, and may be independently set as appropriate in a range of about 50 nm or more and 1 μm or less, for example. The thicknesses of the first electrode 21 and the second electrodes 22 may be typically 600 nm or less, such as 400 nm or less, and typically 100 nm or more, such as 200 nm or more. A detailed configuration of the second electrodes 22 will be described later.

A distance (filter gap) between the first electrode 21 and the second electrodes 22 is not strictly limited. Narrowing the filter gap is preferable because field intensity formed in the ion separation space (corresponding to a dispersion voltage described later) can be effectively increased. However, when the filter gap is too narrow, there is a trade-off that discharge and air flow turbulence are likely to occur between the first electrode 21 and the second electrodes 22. Thus, the filter gap may be, for example, about 50 μm or more and, for example, about 1 mm or less.

A material for the first electrode 21 and the second electrodes 22 is not limited. The material for the first electrode 21 and the second electrodes 22 may be any of various conductive materials capable of generating an electrical field, which will be described later, between the electrodes 21 and 22, and may be a metal material, an inorganic conductive material, or an organic conductive material. When a sample to be detected and ions thereof are considered to be metal corrosive, either the inorganic conductive material or the organic conductive material may be used as the conductive material for surfaces of the first electrode 21 and the second electrodes 22. The metal material for the first electrode 21 and the second electrodes 22 is not limited. For example, when the first electrode 21 and the second electrodes 22 are fabricated by a lithography technique using an ArF excimer laser, the first electrode 21 and the second electrodes 22 may be made of one metal selected from highly conductive metals such as gold (Au), copper (Cu), titanium (Ti), aluminum (Al), chromium (Cr), molybdenum (Mo), tantalum (Ta), tungsten (W), and alloys of these metals, alloys containing two or more of these metals, and the like. Among these metal materials, for example, W/Ta, Ti/Al, Ti/Al/Ti, Cu/Ti, or the like may be layered in order from an upper layer side, thereby enhancing physical properties such as adhesion to underlayers (typically, the first substrate 23 and the second substrate 24). Examples of inorganic conductive materials include indium tin oxide (ITO), indium zinc oxide (IZO), indium gallium zinc oxide (IGZO), and ZnO. Examples of organic conductive materials include polyacetylene and polythiophenes. The first electrode 21 and the second electrodes 22 may have layered structures of two or more of a metal material, an inorganic conductive material, and an organic conductive material.

The first substrate 23 is a component that supports the first electrode 21 and the like. In the present embodiment, the first electrode 21 and the deflection electrodes 27 are provided on the first substrate 23 at positions separated in the X-axis direction. The second substrate 24 is a component that supports the second electrodes 22 and the like. In the present embodiment, the second electrodes 22 and the detection electrodes 26 are provided on the second substrate 24 at positions separated in the X-axis direction. The first substrate 23 and the second substrate 24 are disposed such that main surfaces (examples of support surfaces) on which the electrodes 21 and 27, and the electrodes 22 and 26 are provided face each other. Both the first substrate 23 and the second substrate 24 are long rectangular flat plates. An air supply direction of the pump 30 (moving direction of charged particles) in the flow path 25 coincides with longitudinal directions of the first substrate 23 and the second substrate 24 (X-axis direction). The first electrode 21 and the second electrodes 22 are disposed on an upstream side in the air supply direction, while the deflection electrodes 27 and the detection electrodes 26 are disposed on a downstream side in the air supply direction. Specific shapes of the first substrate 23 and the second substrate 24 are not limited as long as they can support the first electrode 21 and the second electrodes 22, and the deflection electrodes 27 and the detection electrodes 26 in parallel with a predetermined gap. For example, the first substrate 23 and the second substrate 24 may be tubular (e.g., square tubular or tubular) as a single component.

The first substrate 23 and the second substrate 24 of the present embodiment can be made of any of various insulating materials having electrical insulating properties. Examples of insulating materials include materials having a volume resistivity of $10^7$ Ωcm or more (e.g., $10^{10}$ Ωcm or more, $10^{12}$ Ωcm or more, or $10^{15}$ Ωcm or more) at room temperature (e.g., 25° C.), such as organic materials and inorganic materials having the above volume resistivity. Although not limited thereto, in the present embodiment, flat glass substrates are used as the first substrate 23 and the second substrate 24 from the viewpoint that the electrodes can be suitably formed by a lithography technique. Thicknesses of the first substrate 23 and the second substrate 24 are not limited, but may be, for example, about 0.1 mm to 1 mm (such as 0.5 mm or 0.7 mm).

The detection electrodes 26 are components that receive charges of charged particles introduced into the detection cell 20 when the charged particles come into contact with the detection electrodes 26. The detection electrodes 26 are third electrodes arranged side by side on the downstream side of the first electrode 21 and the second electrodes 22 in the flow path 25. The detection electrodes 26 have collecting surfaces that receive charged particles. The detection electrodes 26 are connected to the control unit 40. With such a configuration, the control unit 40 can count the number of charged particles that the detection electrodes 26 have received on the collecting surfaces. A detailed configuration of the detection electrodes 26 will be described later.

The deflection electrodes 27 are components for deflecting the charged particles introduced into the detection cell 20 toward the detection electrodes 26 so that the detection electrodes 26 collect the charged particles. The deflection electrodes 27 are electrodes arranged side by side on the downstream side of the first electrode 21 and the second electrodes 22 in the flow path 25. The deflection electrodes 27 are placed so as to face the detection electrodes 26. The deflection electrodes 27 are connected to a second potential adjustment unit 42, which will be described later. The deflection electrodes 27 can form electrical fields between the detection electrodes 26 and the deflection electrodes 27 that deflect charged particles to the detection electrodes 26 by applying voltages by the second potential adjustment unit 42. A space between the detection electrodes 26 and the deflection electrodes 27 is a detection space for detecting charged particles that have passed through the ion separation space.

Shapes of the detection electrodes 26 and the deflection electrodes 27 are not limited. Thicknesses of the detection electrodes 26 and the deflection electrodes 27 may be, for example, about 1 μm or less, typically 600 nm or less, such as 500 nm or less, 400 nm or less, or 200 nm or less. The thicknesses of the detection electrodes 26 and the deflection electrodes 27 may each independently be about 10 nm or more, typically 50 nm or more, such as 100 nm or more. A material and structure of the detection electrodes 26 and the deflection electrodes 27 may be the same as those of the first electrode 21 and the second electrodes 22 described above.

The control unit 40 is a component that controls drive of the analyzer 1. As illustrated in FIG. 2, the control unit 40 of the present embodiment is connected to the detection cell 20. To be more specific, the control unit 40 is connected to the first electrode 21, the second electrodes 22, the detection electrodes 26, and the deflection electrodes 27, and is configured to control operations thereof. The control unit 40 of the present embodiment is additionally connected to the ionization source 10 and the pump 30, and can be connected to an external power supply for supplying power to the analyzer 1.

The control unit 40 is a microcomputer including an interface (I/F) that transmits and receives various kinds of information and the like, a central processing unit (CPU) that executes commands of a control program, a read only memory (ROM) that stores the program that is executed by the CPU, a random access memory (RAM) that is used as a working area for developing the program, a storage unit M that stores various kinds of information, a timer T that has a clocking function, and the like. Although not limited thereto, the ROM may store, for example, computer programs, databases, and data tables used for applying voltages to a first potential adjustment unit 41 the second potential adjustment unit 42, and a third potential adjustment unit 43, which will be described later, respectively as well as a computer program, a database, and a table for executing various analysis processes based on the number of detected charged particles. The storage unit M can store, for example, ID information about an analyte to be analyzed, information related to the number of detected charged particles, information used for various analysis processes, information related to analysis results, and the like.

The control unit 40 includes the first potential adjustment unit 41, the second potential adjustment unit 42, the third potential adjustment unit 43, a measurement unit 44, an ionization source control unit 45, and a flow rate adjustment unit 46. Each of these units may be independently configured by hardware, or may be functionally implemented by execution of a program by the CPU.

The first potential adjustment unit 41 is an element that applies a dispersion voltage DV between at least the first electrode 21 and the second electrodes 22 and controls this dispersion voltage DV. When the dispersion voltage DV is applied between the first electrode 21 and the second electrodes 22, electrical fields are formed between the first electrode 21 and the second electrodes 22. In the present embodiment, the first potential adjustment unit 41 is connected to the first electrode 21, and applies the dispersion voltage DV to the first electrode 21. Therefore, it can be said that the first electrode 21 is a dispersion electrode. The dispersion voltage DV is a bipolar pulse voltage that shows both positive and negative polarities. Potentials in both positive and negative polarities are typically switched asymmetrically with respect to each other. A voltage waveform is an asymmetric pulse waveform that alternately includes a period TH during which the voltage is at a high voltage level VH forming a high electrical field and a period TL during which the voltage is at a low voltage level VL forming a low electrical field. In this voltage waveform, a time average of the voltage is set to 0. Here, ion mobility is constant in a low electrical field regardless of field intensity, but a value of the ion mobility changes depending on the field intensity in a high electrical field. Thus, the first potential adjustment unit 41 is typically connected to a variable voltage generator such as a pulse voltage generator, and can apply, for example, a dispersion voltage with a rectangular waveform. However, the waveform of the dispersion voltage is not limited to this, and may be a sine wave, an intermediate shape between a rectangular wave and a composite wave, or the like.

In the ion separation space between the first electrode 21 and the second electrodes 22, a flow of a carrier gas (typically neutral) containing sample ions is formed at a constant flow rate by driving the pump 30 with the flow rate adjustment unit 46, which will be described later. Here, when the voltage of the high voltage level VH is applied by the first potential adjustment unit 41, a high electrical field is formed in the ion separation space. When the voltage of the low voltage level VL is applied by the first potential adjustment unit 41, a low electrical field is formed in the ion separation space. The high electrical field has a polarity different from that of the low electrical field. When sample ions are sent into an environment in which such mutually asymmetrical electrical fields are alternately generated, the sample ions zigzag so as to be alternately attracted by the first electrode 21 and the second electrodes 22. At this time, the sample ions largely deflected by the first electrode 21 or the second electrodes 22 hit the first electrode 21 or the second electrodes 22 and cannot pass between the first electrode 21 and the second electrodes 22. Only sample ions balanced between the first electrode 21 and the second electrodes 22 pass between the first electrode 21 and the second electrodes 22 and are sent to the detection electrodes 26 located downstream.

The second potential adjustment unit 42 is an element that applies compensation voltages CV between the first electrode 21 and the second electrodes 22 and controls these compensation voltages CV. In the present embodiment, the second potential adjustment unit 42 is connected to the second electrodes 22, and applies the compensation voltages CV to the second electrodes 22. Therefore, it can be said that the second electrodes 22 are compensation electrodes. As described above, only the sample ions balanced in drift electric fields formed between the first electrode 21 and the second electrodes 22 pass between the first electrode 21 and the second electrodes 22. By applying the dispersion voltage DV to the first electrode 21 by the first potential adjustment unit 41 and applying the compensation voltages CV to the second electrodes 22 by the second potential adjustment unit 42, ion species passing between the first electrode 21 and the second electrodes 22 can be changed. The compensation voltage CV is a DC voltage. The compensation voltage CV, for example, changes at a constant change rate and with a period TCV for each predetermined dispersion voltage DV (in other words, the compensation voltage CV changes between a lower limit voltage $V_{CVL}$ and an upper limit voltage $V_{CVH}$ with the period TCV). Thus, ion species having different mobilities can be sequentially sent to the detection space.

The third potential adjustment unit 43 is an element that applies a predetermined potential difference between the detection electrodes 26 and the deflection electrodes 27. Thus, the sample ions that have passed through the ion separation space and entered the detection space can be deflected toward the detection electrodes 26. In the present embodiment, the third potential adjustment unit 43 is connected to the deflection electrodes 27, and applies potentials to the deflection electrodes 27. The third potential adjustment unit 43 adjusts the potentials of the deflection electrodes 27 such that when sample ions introduced into the detection cell 20 are positive ions, the potentials of the deflection electrodes 27 are higher than those of the detection electrodes 26 and when sample ions introduced into the detection cell 20 are negative ions, the potentials of the deflection electrodes 27 are lower than those of the detection electrodes 26.

The measurement unit 44 is an element that detects the number of charged particles that have reached the detection electrodes 26. The measurement unit 44 is connected to the detection electrodes 26, and converts current values based on the numbers of charged particles that have reached the detection electrodes 26 into voltage values using a transimpedance circuit to acquire the numbers of ions. The measurement unit 44 may be configured not only to measure the number of charged particles but also to qualify and quantify the charged particles in cooperation with the first potential adjustment unit 41, for example. Information related to the number of charged particles and the like measured by the measurement unit 44 is stored in the storage unit M, for example.

The ionization source control unit 45 is connected to the ionization source 10 and is configured to control an operation of the ionization source 10. The ionization source control unit 45 can switch charged particles to be generated between positive ions and negative ions, for example, by switching a polarity of the voltage applied to the needle electrode in the ionization source 10 between positive and negative. Although not limited thereto, when the ionization source control unit 45 causes the ionization source 10 to generate negative charged particles, the first potential adjustment unit 41, the second potential adjustment unit 42, and the third potential adjustment unit 43 adjust the voltages applied to the first electrode 21 and the deflection electrodes 27, respectively, so that the negative charged particles can pass through the flow path 25. When the ionization source control unit 45 causes the ionization source 10 to generate positive charged particles, the first potential adjustment unit 41, the second potential adjustment unit 42, and the third potential adjustment unit 43 adjust the voltages applied to the first electrode 21 and the deflection electrodes 27, respectively, so that the positive charged particles can pass through the flow path 25.

The flow rate adjustment unit 46 is connected to the pump 30 and is configured to control an operation of the pump 30. The flow rate adjustment unit 46 can adjust a flow rate of gas in the detection cell 20 by controlling, for example, timings of driving and stopping the pump 30 and a rotational speed of a fan of the pump 30.

Figure 3:
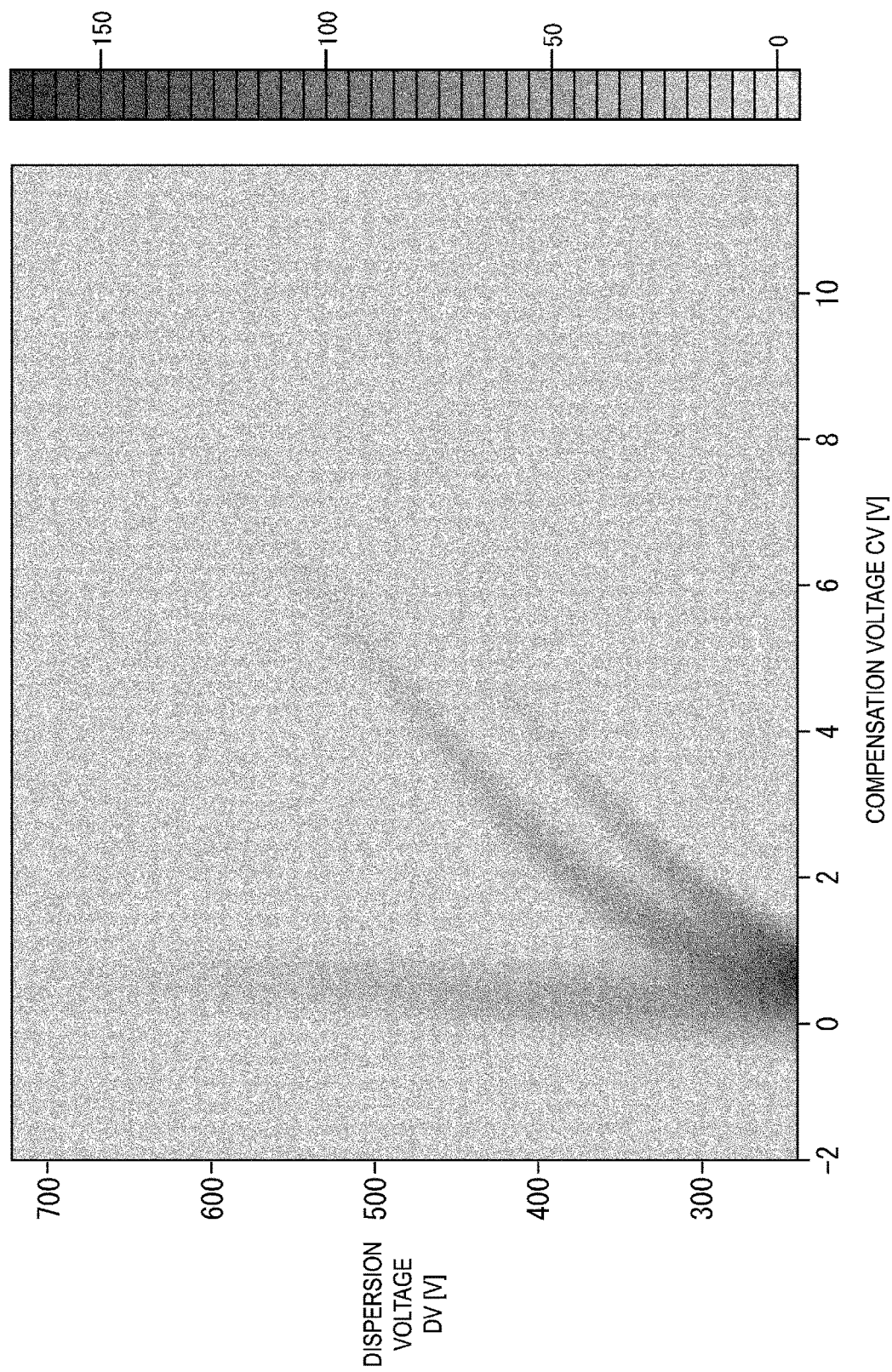
FIG. 3 is a map graph showing FAIMS spectra obtained by the mobility analyzer according to the first embodiment.

FAIMS spectra as illustrated in FIG. 3 can be obtained from a relationship between the dispersion voltage DV applied to the first electrode 21 by the first potential adjustment unit 41, the compensation voltages CV applied to the second electrodes 22 by the second potential adjustment unit 42, and electric signals from the detection electrodes 26. FIG. 3 is a map graph illustrating a relationship between analysis conditions (the compensation voltage CV and the dispersion voltage DV) and the number of sample ions (ion current) detected under the analysis conditions. In FIG. 3, a vertical axis represents the dispersion voltage DV (unit is "V"), and a horizontal axis represents the compensation voltage CV (unit is "V"). In the graph in FIG. 3, the analysis conditions are indicated by darker colors as more sample ions are detected. In order to obtain the FAIMS spectra shown in FIG. 3, for example, the dispersion voltage DV is set to the minimum value, and the compensation voltage CV is scanned by changing it from the lower limit voltage $V_{CVL}$ to the upper limit voltage $V_{CVH}$. Then, the dispersion voltage DV is changed to a value larger than the minimum value, and the compensation voltage CV is scanned again. The compensation voltage CV may be scanned repeatedly until the dispersion voltage DV reaches its maximum value.

Figure 4:
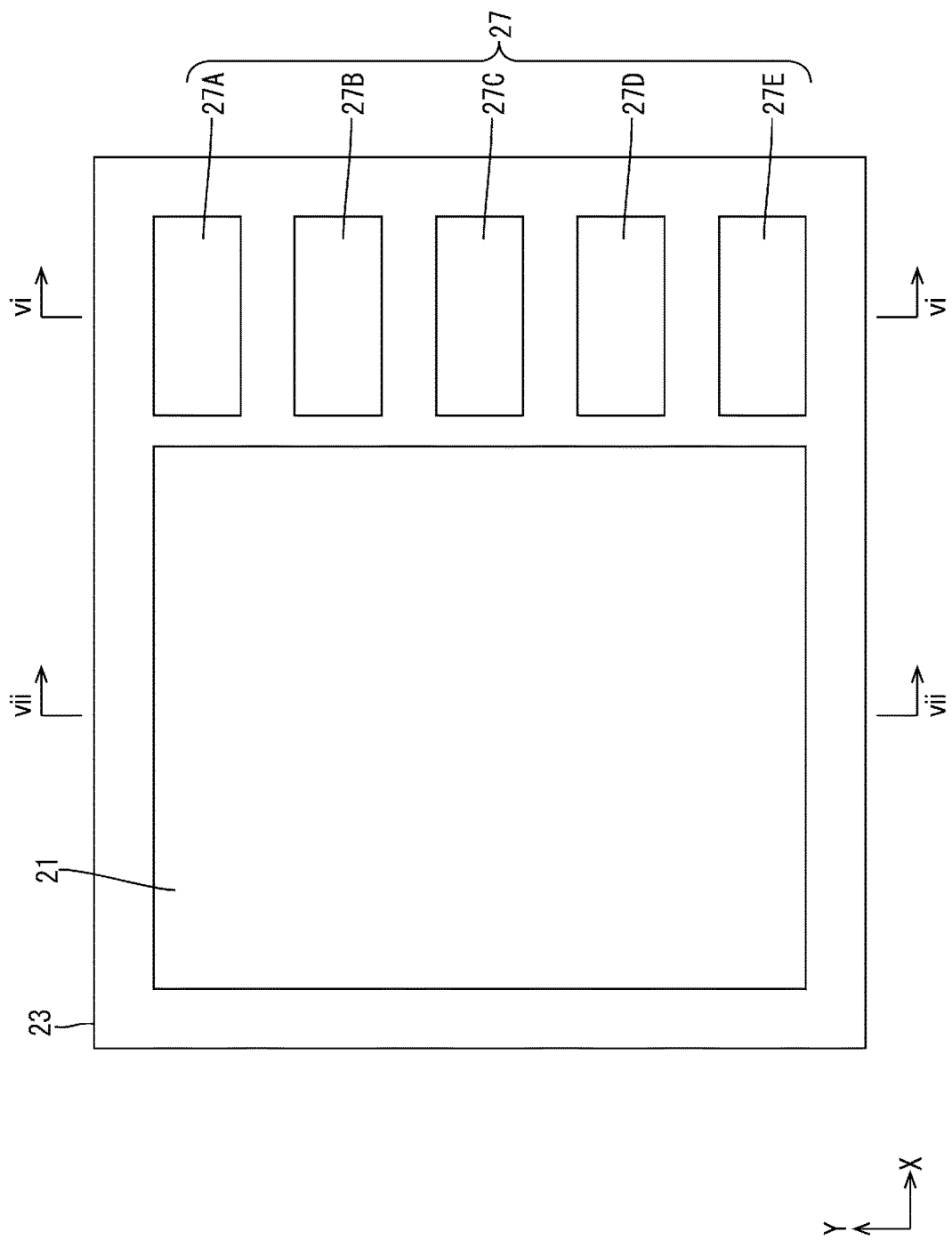
FIG. 4 is a plan view of a first substrate included in the detection cell according to the first embodiment.

Next, a detailed configuration of the detection cell 20 will be described with reference to FIGS. 4 to 7. As illustrated in FIG. 4, the first substrate 23, which is a constituent element of the detection cell 20, has a laterally long rectangular shape in a plan view. The first substrate 23 is provided with the first electrode 21 and the multiple deflection electrodes 27. The first electrode 21 has a slightly vertically long rectangular shape in a plan view, and is located on one end side (upstream side) of the first substrate 23 in the X-axis direction. The first electrode 21 has a dimension of about 15 mm in the X-axis direction, for example, and a dimension of about 18 mm in the Y-axis direction, for example. The deflection electrodes 27 are located on another end side (downstream side) of the first substrate 23 in the X-axis direction. The multiple deflection electrodes 27 each have laterally long rectangular shapes in a plan view, and the deflection electrodes 27 are arranged side by side with spaces in the Y-axis direction. To be specific, the number of the deflection electrodes 27 in a row is, for example, five. The deflection electrodes 27 include a first deflection electrode 27A, a second deflection electrode 27B, a third deflection electrode 27C, a fourth deflection electrode 27D, and a fifth deflection electrode 27E in order from a top in FIG. 4. In the following description, when the multiple deflection electrodes 27 are distinguished, suffixes A to E are attached to the reference numerals as "first deflection electrode to fifth deflection electrode", respectively, and when the multiple deflection electrodes 27 are collectively referred to without distinguishing between them, no suffixes are attached to the reference numerals. Pitches between the multiple deflection electrodes 27 arranged in the Y-axis direction are substantially constant. Width dimensions (dimensions in the Y-axis direction) of the deflection electrodes 27 are larger than the spaces between adjacent deflection electrodes 27. A dimension of the first electrode 21 in the Y-axis direction is the sum of the width dimensions of all the deflection electrodes 27 and the sum of the spaces between all adjacent deflection electrodes 27. That is, the dimension of the first electrode 21 is the same as a distance between both ends of the multiple deflection electrodes 27 along the Y-axis direction.

Figure 5:
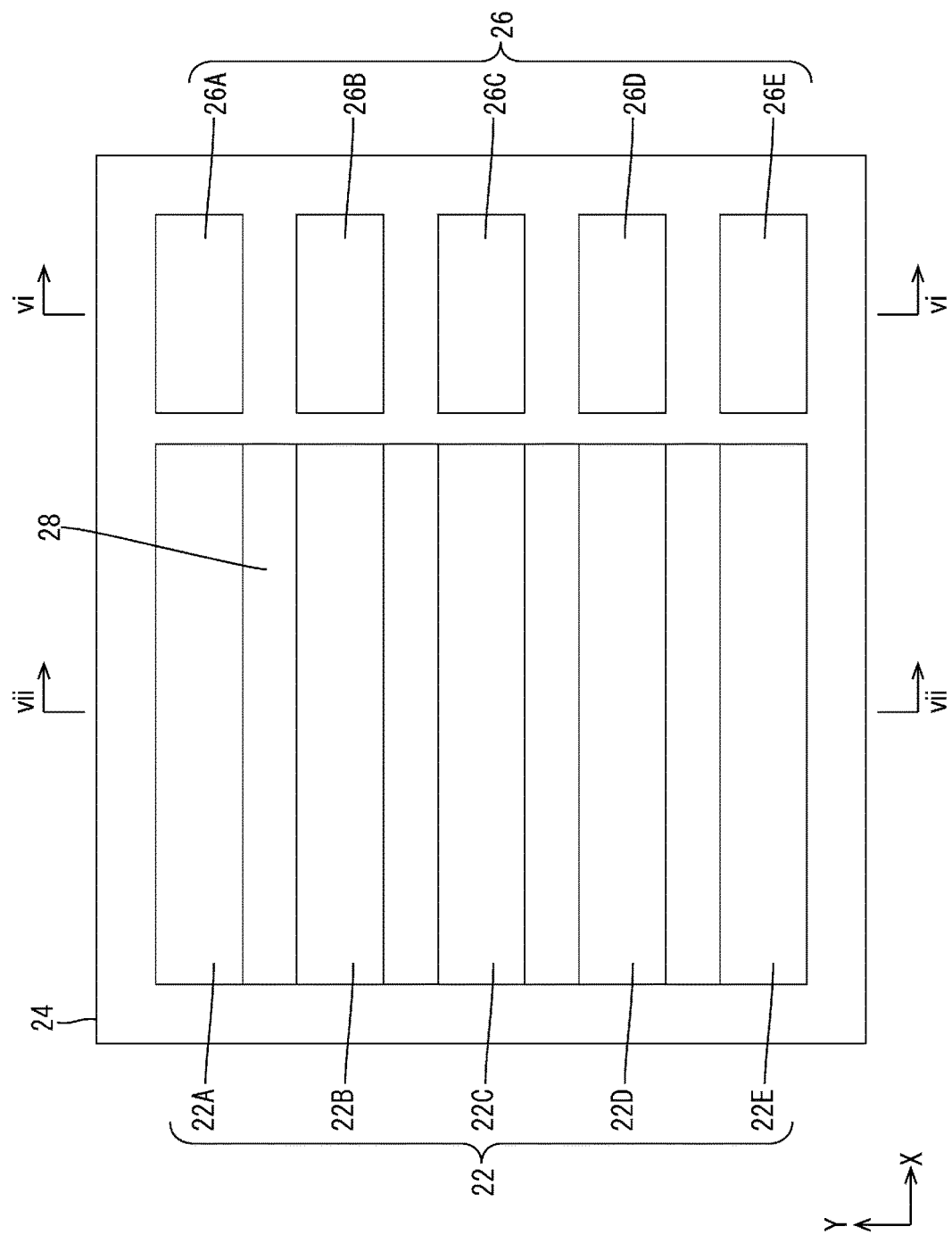
FIG. 5 is a plan view of a second substrate included in the detection cell according to the first embodiment.

As illustrated in FIG. 5, the second substrate 24, which is a constituent element of the detection cell 20, has a laterally long rectangular shape in a plan view. The second substrate 24 is provided with a power supply electrode (fourth electrode) 28 in addition to the second electrodes 22 and the multiple detection electrodes 26. The power supply electrode 28 is connected to the second potential adjustment unit 42 and the second electrodes 22, and can supply potentials supplied from the second potential adjustment unit 42 to the second electrodes 22. The second electrodes 22 and the power supply electrode 28 are located on one end side (upstream side) of the second substrate 24 in the X-axis direction. First, the second electrodes 22 will be described in detail.

The multiple second electrodes 22 have laterally long rectangular shapes in a plan view, and are arranged side by side with spaces in the Y-axis direction (third direction). To be specific, the number of the second electrodes 22 in a row is, for example, five. The second electrodes 22 include a first filter electrode (fifth electrode) 22A, a second filter electrode (sixth electrode) 22B, a third filter electrode 22C, a fourth filter electrode 22D, and a fifth filter electrode 22E in order from a top in FIG. 5. In the following description, when the multiple second electrodes 22 are distinguished, suffixes A to E are attached to the reference numerals as "first filter electrode to fifth filter electrode", respectively and when the multiple second electrodes 22 are collectively referred to without distinguishing between them, no suffixes are attached to the reference numerals. Pitches between the multiple second electrodes 22 arranged in the Y-axis direction are substantially constant. The pitches between the multiple second electrodes 22 arranged in the Y-axis direction are substantially the same as the pitches between the multiple deflection electrodes 27 arranged in the Y-axis direction. To be specific, the spaces between adjacent second electrodes 22 are, for example, in a range of 10 μm to 1.5 mm. In the present embodiment, the spaces between the adjacent second electrodes 22 are, for example, about 1.5 mm. Width dimensions (dimensions in the Y-axis direction) of the second electrodes 22 are larger than the spaces between the adjacent second electrodes 22. To be specific, when the width dimensions of the second electrodes 22 are, for example, 1 mm or more, the second electrodes 22 can sufficiently filter sample ions. In the present embodiment, the width dimensions of the second electrodes 22 are, for example, about 2.4 mm. The width dimensions of the second electrodes 22 are substantially the same as the width dimensions of the deflection electrodes 27.

The detection electrodes 26 are located on another end side (downstream side) of the second substrate 24 in the X-axis direction. The detection electrodes 26 have laterally long rectangular shapes in a plan view, and are arranged side by side with spaces in the Y-axis direction. To be specific, the number of the detection electrodes 26 in a row is, for example, five. The detection electrodes 26 include a first detection electrode (seventh electrode) 26A, a second detection electrode (eighth electrode) 26B, a third detection electrode 26C, a fourth detection electrode 26D, and a fifth detection electrode 26E in order from a top in FIG. 5. In the following description, when the multiple detection electrodes 26 are distinguished, suffixes A to E are attached to the reference numerals as "first detection electrode to fifth detection electrode", respectively, and when the multiple detection electrodes 26 are collectively referred to without distinguishing between them, no suffixes are attached to the reference numerals.

Figure 6:
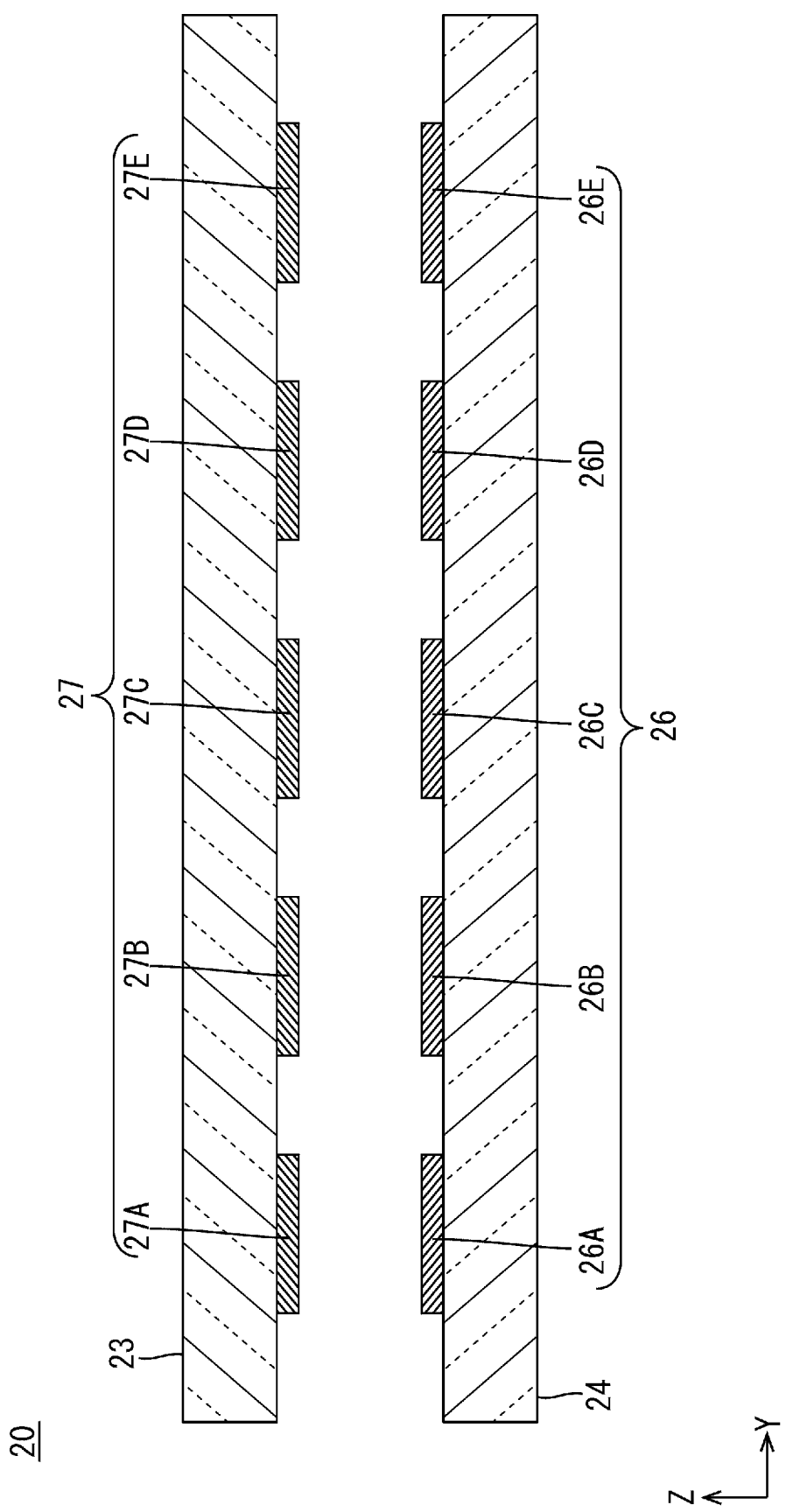
FIG. 6 is a cross-sectional view taken along line vi-vi in FIGS. 4 and 5 in the detection cell according to the first embodiment.

As illustrated in FIGS. 5 and 6, pitches between the multiple detection electrodes 26 arranged in the Y-axis direction are substantially constant. Pitches between the multiple detection electrodes 26 arranged in the Y-axis direction are substantially the same as the pitches between the multiple second electrodes 22 arranged in the Y-axis direction and the pitches between the multiple deflection electrodes 27 arranged in the Y-axis direction. The spaces between the adjacent detection electrodes 26 are substantially the same as the spaces between the adjacent second electrodes 22 and the spaces between the adjacent deflection electrodes 27. Width dimensions (dimensions in the Y-axis direction) of the detection electrodes 26 are larger than the spaces between the adjacent detection electrodes 26. The width dimensions of the detection electrodes 26 are substantially the same as the width dimensions of the second electrodes 22 and the width dimensions of the deflection electrodes 27. The detection electrodes 26 have the same centers as the second electrodes 22 and the deflection electrodes 27 in the Y-axis direction. The first detection electrode 26A is linearly aligned downstream of the first filter electrode 22A along the X-axis direction, and faces the first deflection electrode 27A. The second detection electrode 26B is linearly aligned downstream of the second filter electrode 22B along the X-axis direction, and faces the second deflection electrode 27B. The third detection electrode 26C is linearly aligned downstream of the third filter electrode 22C along the X-axis direction, and faces the third deflection electrodes 27C. The fourth detection electrode 26D is linearly aligned downstream of the fourth filter electrode 22D along the X-axis direction, and faces the fourth deflection electrode 27D. The fifth detection electrode 26E is linearly aligned downstream of the fifth filter electrode 22E along the X-axis direction, and faces the fifth deflection electrode 27E.

As illustrated in FIG. 5, the power supply electrode 28 has a slightly vertically long rectangular shape in a plan view, and is located on the one end side (upstream side) of the second substrate 24 in the X-axis direction. The power supply electrode 28 extends along the X-axis direction (first direction) and also extends along the Y-axis direction (third direction). The power supply electrode 28 has substantially the same dimensions as the first electrode 21 in the X-axis direction and the Y-axis direction. To be specific, the power supply electrode 28 has a dimension of about 15 mm in the X-axis direction, for example, and a dimension of 18 mm in the Y-axis direction, for example.

Figure 7:
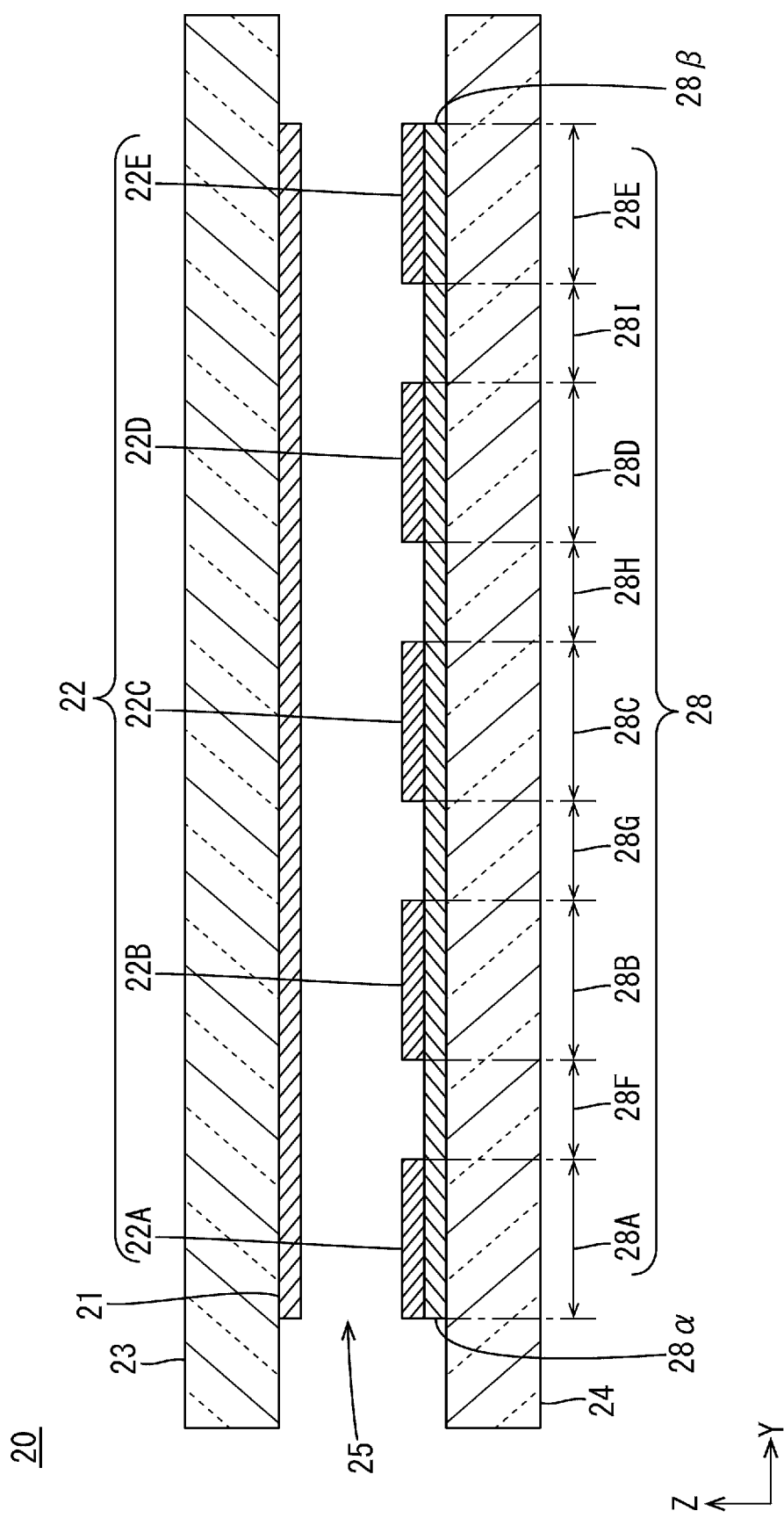
FIG. 7 is a cross-sectional view taken along line vii-vii in FIGS. 4 and 5 in the detection cell according to the first embodiment.

As illustrated in FIGS. 1 and 7, the power supply electrode 28 is disposed so that substantially an entire area of the power supply electrode 28 overlaps the first electrode 21 in a plan view. That is, the power supply electrode 28 and the first electrode 21 have the same centers in the X-axis direction and the Y-axis direction. The power supply electrode 28 overlaps the second electrodes 22 on a side (second substrate 24 side) opposite to a first electrode 21 side in the Z-axis direction. The power supply electrode 28 has substantially the same dimension as the second electrodes 22 in the X-axis direction. The power supply electrode 28 is in contact with surfaces of the second electrodes 22 facing the power supply electrode 28 over the entire length in the X-axis direction. A dimension of the power supply electrode 28 in the Y-axis direction is larger than the width dimension of each of the second electrodes 22. In detail, the dimension of the power supply electrode 28 in the Y-axis direction is the sum of the width dimensions of all the second electrodes 22 and the sum of the spaces between all the adjacent second electrodes 22. That is, the dimension of the power supply electrode 28 is the same as a distance between both ends of the multiple second electrodes 22 along the Y-axis direction. The power supply electrode 28 overlaps all the second electrodes 22, and is in contact with the entire surfaces of all the second electrodes 22 facing the power supply electrode 28.

The power supply electrode 28 includes portions that overlap the second electrodes 22 and are in direct contact with the second electrodes 22, and portions that do not overlap the second electrodes 22 and are located between the second electrodes 22 adjacent in the Y-axis direction. In the following description, of the power supply electrode 28, a portion overlapping the first filter electrode 22A is referred to as a first overlapping portion 28A, a portion overlapping the second filter electrode 22B is referred to as a second overlapping portion 28B, a portion overlapping the third filter electrode 22C is referred to as a third overlapping portion 28C, a portion overlapping the fourth filter electrode 22D is referred to as a fourth overlapping portion 28D, and a portion overlapping the fifth filter electrode 22E is referred to as a fifth overlapping portion 28E. Of the power supply electrode 28, a portion located between the first filter electrode 22A and the second filter electrode 22B in the Y-axis direction is referred to as a first non-overlapping portion (first inter-electrode portion) 28F, a portion located between the second filter electrode 22B and the third filter electrode 22C in the Y-axis direction is referred to as a second non-overlapping portion (second inter-electrode portion) 28G, a portion located between the third filter electrode 22C and the fourth filter electrode 22D in the Y-axis direction is referred to as a third non-overlapping portion (third inter-electrode portion) 28H, and a portion located between the fourth filter electrode 22D and the fifth filter electrode 22E in the Y-axis direction is referred to as a fourth non-overlapping portion (fourth inter-electrode portion) 28I.

The power supply electrode 28 is made of a conductive film having a sheet resistance higher than sheet resistances of the second electrodes 22, that is, a high-resistance film (first conductive film). To be specific, the power supply electrode 28 has a sheet resistance in a range of, for example, 40 Ω/sq. to 100 kΩ/sq. The power supply electrode 28 is made of, for example, a metal oxide thin film (ITO, IZO, etc.) or a metal nitride thin film (CrN, TaN, etc.). A thickness of the high-resistance film forming the power supply electrode 28 is, for example, in a range of 50 nm to 300 nm. On the other hand, the second electrodes 22 are made of a conductive film having sheet resistances lower than the sheet resistance of the power supply electrode 28, that is, a low-resistance film (second conductive film). To be specific, the second electrodes 22 have a sheet resistance of, for example, 40 Ω/sq. or less. The second electrode 22 is made of, for example, a metal thin film (a layered thin film of W/TaN, Ti/Al/Ti, MoW, or the like layered in order from an upper layer side) or a metal oxide thin film (heat-treated ITO, etc.). A thickness of the low-resistance film forming the second electrodes 22 is, for example, in a range of 50 nm to 300 nm. In manufacturing, a high-resistance film may be formed on the second substrate 24 first, and the high-resistance film may be patterned to form the power supply electrode 28, and then a low-resistance film may be formed, and the low-resistance film may be patterned to form the second electrodes 22.

Different potentials are supplied by the second potential adjustment unit 42 to one end portion 28a and another end portion 28β in the Y-axis direction of the power supply electrode 28 having a configuration described above. To be specific, a first potential $V_{cmax}$ is supplied to the one end portion 28a of the power supply electrode 28 in the Y-axis direction (upper side in FIG. 5, left side in FIG. 7). A second potential $V_{cmin}$ lower than the first potential $V_{cmax}$ is supplied to the other end portion 28β the power supply electrode 28 in the Y-axis direction (lower side in FIG. 5 and right side in FIG. 7). The multiple second electrodes 22 are connected to the power supply electrode 28 at different positions in the Y-axis direction. In detail, the first filter electrode 22A is connected to the power supply electrode 28 at a position closest to the one end portion 28a in the Y-axis direction. More in detail, the first filter electrode 22A is disposed so as to overlap at least the one end portion 28a of the power supply electrode 28 in the Y-axis direction. Thus, the first overlapping portion 28A includes the one end portion 28a of the power supply electrode 28 in the Y-axis direction. The second filter electrode 22B is connected to the power supply electrode 28 at a position second closest to the one end portion 28a in the Y-axis direction. Therefore, the first filter electrode 22A is connected to the power supply electrode 28 at a position relatively closer to the one end portion 28a than a connection position of the second filter electrode 22B in the Y-axis direction. The second filter electrode 22B is connected to the power supply electrode 28 at a position relatively closer to the other end portion 28β than a connection position of the first filter electrode 22A in the Y-axis direction. The third filter electrode 22C is connected to the power supply electrode 28 at a position third closest to the one end portion 28a in the Y-axis direction. The fourth filter electrode 22D is connected to the power supply electrode 28 at a position fourth closest to the one end portion 28a in the Y-axis direction. The fifth filter electrode 22E is connected to the power supply electrode 28 at a position closest to the other end portion 28B in the Y-axis direction. More in detail, the fifth filter electrode 22E is disposed so as to overlap at least the other end portion 28β the power supply electrode 28 in the Y-axis direction. Thus, the fifth overlapping portion 28E includes the other end portion 28β of the power supply electrode 28 in the Y-axis direction.

As described above, the sheet resistance of the power supply electrode 28 is higher than the sheet resistances of the second electrodes 22. Thus, a voltage drop corresponding to a distance between the connection position of each of the filter electrodes 22A to 22E to the power supply electrode 28 in the Y-axis direction and the one end portion 28a of the power supply electrode 28, which is set to the first potential $V_{cmax}$, occurs in a potential supplied to each of the filter electrodes 22A to 22E. That is, the larger the distance described above, the larger the voltage drop that occurs tends to be. To be specific, the closer the connection position of each of the filter electrodes 22A to 22E is to the one end portion 28a (the first overlapping portion 28A) of the power supply electrode 28, the higher the potential supplied to each of the filter electrodes 22A to 22E and conversely, the closer the connection position of each of the filter electrodes 22A to 22E is to the other end portion 28B (the fifth overlapping portion 28E) of the power supply electrode 28, the lower the potential supplied to each of the filter electrodes 22A to 22E. The potential difference generated between the second electrodes 22 adjacent in the Y-axis direction changes according to the space between the second electrodes 22 adjacent in the Y-axis direction, that is, the width dimension of each of the non-overlapping portions 28F to 28I. The spaces between the second electrodes 22 adjacent in the Y-axis direction are, for example, in a range of 10 μm to 1.5 mm, and are, for example, 1.5 mm in the present embodiment. By setting the spaces between the second electrodes 22 adjacent in the Y-axis direction within the numerical range described above, the potential differences generated between the second electrodes 22 adjacent in the Y-axis direction can be sufficiently large.

Figure 8:
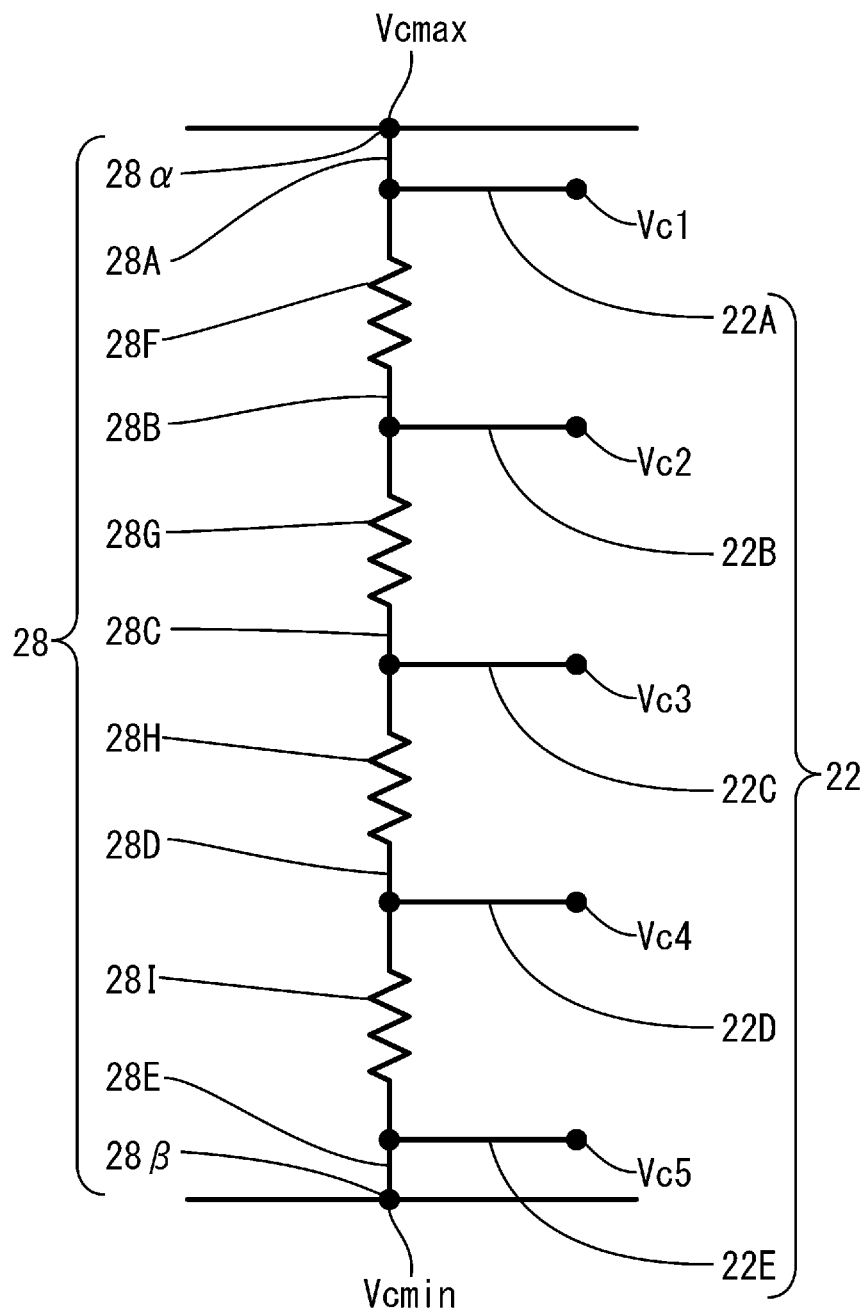
FIG. 8 is a circuit diagram of a power supply electrode and second electrodes included in the detection cell according to the first embodiment.

The potentials of the power supply electrode 28 and the filter electrodes 22A to 22E will be described with reference to FIGS. 8 and 9. FIG. 8 is a circuit diagram of the power supply electrode 28 and the filter electrodes 22A to 22E. The non-overlapping portions 28F to 28I of the power supply electrode 28, which are located between the second electrodes 22 adjacent in the Y-axis direction, practically function as resistors. Thus, in the circuit diagram illustrated in FIG. 8, the non-overlapping portions 28F to 28I are illustrated as resistors. In the present embodiment, since the width dimensions of all the non-overlapping portions 28F to 28I are substantially equal, the resistance values of the non-overlapping portions 28F to 28I, which are resistors, are also substantially equal. A resistance value of the non-overlapping portions 28F to 28I is, for example, about 16 kΩ. The overlapping portions 28A to 28E included in the power supply electrode 28 have the same potentials as the overlapping filter electrodes 22A to 22E, respectively. In FIG. 8, of the power supply electrode 28 in the Y-axis direction, the first potential at the one end portion 28a is denoted by "$V_{cmax}$" and the second potential at the other end portion 28β is denoted by "$V_{cmin}$". In FIG. 8, the potential of the first filter electrode 22A is denoted by "$V_{c1}$", the potential of the second filter electrode 22B is denoted by "$V_{c2}$", the potential of the third filter electrode 22C is denoted by "$V_{c3}$", the potential of the fourth filter electrode 22D is denoted by "$V_{c4}$", and the potential of the fifth filter electrode 22E is denoted by "$V_{c5}$". Since the first filter electrode 22A is disposed so as to overlap the one end portion 28a (the first overlapping portion 28A) of the power supply electrode 28 in the Y-axis direction, the potential $V_{c1}$ of the first filter electrode 22A is equal to the first potential $V_{cmax}$. Since the fifth filter electrode 22E is disposed so as to overlap the other end portion 28B (the fifth overlapping portion 28E) of the power supply electrode 28 in the Y-axis direction, the potential $V_{c5}$ of the fifth filter electrode 22E is equal to the second potential $V_{cmin}$.

Figure 9:
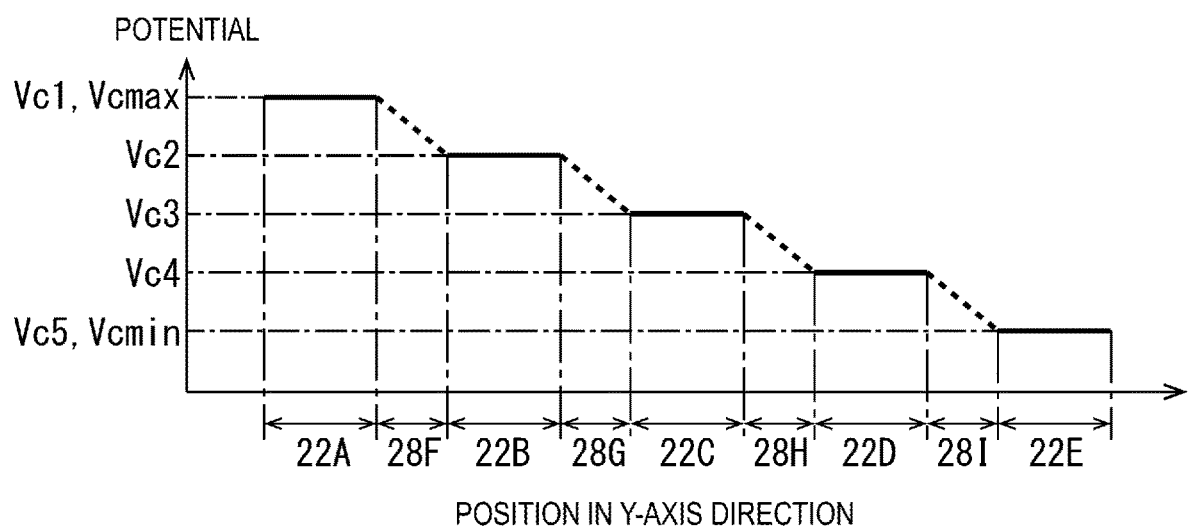
FIG. 9 is a graph conceptually showing a relationship between positions of the second electrodes in a Y-axis direction and potentials of the second electrodes according to the first embodiment.

FIG. 9 is a graph conceptually showing a relationship between the positions of the filter electrodes 22A to 22E in the Y-axis direction and the potentials $V_{c1}$ to $V_{c5}$ of the filter electrodes 22A to 22E. In FIG. 9, a vertical axis represents the potentials $V_{c1}$ to $V_{c5}$ of the filter electrodes 22A to 22E, and a horizontal axis represents the positions of the filter electrodes 22A to 22E in the Y-axis direction. The horizontal axis of FIG. 9 indicates spans of the filter electrodes 22A to 22E in the Y-axis direction and spans of the non-overlapping portions 28F to 28I included in the power supply electrode 28 in the Y-axis direction. As shown in FIG. 9, the potential $V_{c1}$ of the first filter electrode 22A is maximum, the potentials are, in descending order, the potential $V_{c2}$ of the second filter electrode 22B, the potential $V_{c3}$ of the third filter electrode 22C, and the potential $V_{c4}$ of the fourth filter electrode 22D, and the potential $V_{c5}$ of the fifth filter electrode 22E is minimum. The potentials $V_{c1}$ to $V_{c5}$ of the filter electrodes 22A to 22E are constant in the spans of the filter electrodes 22A to 22E in the Y-axis direction. This is mainly because the filter electrodes 22A to 22E are made of the low-resistance film having the sheet resistance lower than the sheet resistance of the power supply electrode 28. The contact between the filter electrodes 22A to 22E and the power supply electrode 28 over the entire areas in the X-axis direction and the Y-axis direction also contributes to keeping the potentials $V_{c1}$ to $V_{c5}$ of the filter electrodes 22A to 22E constant. FIG. 9 shows that voltage drops occur in the non-overlapping portions 28F to 28I.

The potentials $V_{c1}$ to $V_{c5}$ of the filter electrodes 22A to 22E can be calculated based on the following general expression. The general expression for calculating the potentials $V_{c1}$ to $V_{c5}$ is "$n/m(V_{cmax}-V_{cmin})+V_{cmin}$". "m" included in this general expression is the sum of the resistance values of the resistors present between any one of the filter electrodes 22A to 22E having the potentials $V_{c1}$ to $V_{c5}$ to be calculated and the other end portion 28β of the power supply electrode 28 in the Y-axis direction. "n" included in the general expression is the sum of the resistance values of the resistors present between the one end portion 28a and the other end portion 28B in the power supply electrode 28 in the Y-axis direction. In the present embodiment, since the resistance values of all the resistors are equal, the "sum of resistance values" described above coincides with "the number of resistors". In detail, the potential $V_{c1}$ of the first filter electrode 22A is calculated by Expression 1 "$4/4\,(V_{cmax}-V_{cmin})+V_{cmin}$". The potential $V_{c2}$ of the second filter electrode 22B is calculated by Expression 2 "$3/4\,(V_{cmax}-V_{cmin})+V_{cmin}$". The potential $V_{c3}$ of the third filter electrode 22C is calculated by Expression 3 "$2/4\,(V_{cmax}-V_{cmin})+V_{cmin}$". The potential $V_{c4}$ of the fourth filter electrode 22D is calculated by Expression 4 "$1/4\,(V_{cmax}-V_{cmin})+V_{cmin}$". The potential $V_{c5}$ of the fifth filter electrode 22E is calculated by Expression 5 "$0/4\,(V_{cmax}-V_{cmin})+V_{cmin}$". As a specific example, for example, when the first potential $V_{cmax}$ is "20 V" and the second potential $V_{cmin}$ is "19.6 V", the potentials $V_{c1}$ to $V_{c5}$ are calculated based on Equation 1 to Equation 5 described above. Then, the potential $V_{c1}$ is "20 V", the potential $V_{c2}$ is "19.9 V", the potential $V_{c3}$ is "19.8 V", the potential $V_{c4}$ is "19.7 V", and the potential $V_{c5}$ is "19.6 V". Note that the specific numerical values of the first potential $V_{cmax}$ and the second potential $V_{cmin}$ can be appropriately changed other than those described above.

In order to obtain the map graph shown in FIG. 3 by performing measurement using the analyzer 1 having the configuration described above, the compensation voltage CV is scanned by changing it from the lower limit voltage $V_{CVL}$ to the upper limit voltage $V_{CVH}$ while the dispersion voltage DV is set from the minimum value to the maximum value. The number of times the compensation voltage CV is scanned, that is, the number of measurements, will be described with reference to FIGS. 10A and 10B.

FIGS. 10A and 10B are both enlarged views of a part of the map graph shown in FIG. 3. FIG. 10A is a map graph according to a Comparative Example in which the second electrode has a single structure. The Comparative Example is different from an Example described below in that the second electrode is a single electrode having the same size as the first electrode, and the detection electrode and the deflection electrode are also single electrodes. FIG. 10B is a map graph according to an Example in which five second electrodes 22 are provided. The Example is identical to the detection cell 20 described earlier in this paragraph. In FIGS. 10A and 10B, a vertical axis is the dispersion voltages DV1 to DV5, and a horizontal axis is the compensation voltages CV1 to CV10. FIGS. 10A and 10B illustrate a case in which 5 levels of the dispersion voltages DV1 to DV5 and 10 levels of the compensation voltages CV1 to CV10 are used. In addition, the map graphs illustrated in FIGS. 10A and 10B indicate numerical values of the number of measurements. In the Comparative Example illustrated in FIG. 10A, the second electrode has the single structure, and only one of the compensation voltages CV1 to CV10 can be applied in one measurement. Thus, in the Comparative Example, 50 measurements are required to fill the map graph in FIG. 10A. In contrast, in the Example illustrated in FIG. 10B, the number of second electrodes 22 is five, and five of the compensation voltages CV1 to CV10 (e.g., the compensation voltages CV1 to CV5 or the compensation voltages CV6 to CV10) can be applied in one measurement. Thus, in the Example, the number of measurements required to fill the map graph in FIG. 10B is 10. That is, in the Example, the number of measurements is one fifth of that in the Comparative Example.

In a specific measurement, when the first potential $V_{cmax}$ is supplied to the one end portion 28a of the power supply electrode 28 in the Y-axis direction and the second potential $V_{cmin}$ is supplied to the other end portion 28β of the power supply electrode 28 in the Y-axis direction, the potentials $V_{c1}$ to $V_{c5}$ are supplied to the filter electrodes 22A to 22E in accordance with the connection positions to the power supply electrode 28 in the Y-axis direction. Since the detection electrodes 26A to 26E are arranged side by side with the filter electrodes 22A to 22E along the X-axis direction, charged particles filtered by the filter electrodes 22A to 22E having the potentials $V_{c1}$ to $V_{c5}$ can be collected, respectively. Explaining one by one, the first detection electrode 26A collects charged particles filtered by the first filter electrode 22A aligned along the X-axis direction, the second detection electrode 26B collects charged particles filtered by the second filter electrode 22B aligned along the X-axis direction, the third detection electrode 26C collects charged particles filtered by the third filter electrode 22C aligned along the X-axis direction, the fourth detection electrode 26D collects charged particles filtered by the fourth filter electrode 22D aligned along the X-axis direction, and the fifth detection electrode 26E collects charged particles filtered by the fifth filter electrode 22E aligned along the X-axis direction.

Here, the second electrodes 22 have sheet resistances lower than the sheet resistance of the power supply electrode 28. Thus, as shown in FIG. 9, the potentials $V_{c1}$ to $V_{c5}$ of the filter electrodes 22A to 22E are constant within spans of the filter electrodes 22A to 22E, respectively. That is, the potentials $V_{c1}$ to $V_{c5}$ of the filter electrodes 22A to 22E do not change according to the positions in the Y-axis direction as in the related art. Explaining one by one, the potential $V_{c1}$ is substantially constant over the entire span of the first filter electrode 22A in the Y-axis direction, the potential $V_{c2}$ is substantially constant over the entire span of the second filter electrode 22B in the Y-axis direction, the potential $V_{c3}$ is substantially constant over the entire span of the third filter electrode 22C in the Y-axis direction, the potential $V_{c4}$ is substantially constant over the entire span of the fourth filter electrode 22D in the Y-axis direction, and the potential $V_{c5}$ is substantially constant over the entire span of the fifth filter electrode 22E in the Y-axis direction. Thus, resolution of the detection results based on the charged particles collected due to the potentials $V_{c1}$ to $V_{c5}$ of the filter electrodes 22A to 22E can be made higher than in the related art. Since only the first potential $V_{cmax}$ and the second potential $V_{cmin}$ are supplied to the one end portion 28a and the other end portion 28β of the power supply electrode 28 in the Y-axis direction, respectively, the circuit for supplying potentials to the second electrodes 22 can be simpler than known circuits. For example, when filling the map graph in FIG. 10B, in order to apply 10 levels of the compensation voltages CV1 to CV10 to the filter electrodes 22A to 22E, the first potential $V_{cmax}$ and the second potential $V_{cmin}$ may be different between the first measurement (e.g., a measurement in which the compensation voltages CV1 to CV5 are applied) and the second measurement (e.g., a measurement in which the compensation voltages CV6 to CV10 are applied).

As described above, the detection cell (detector) 20 of the present embodiment includes the first electrode 21, the second electrodes 22 facing the first electrode 21 with a space and forming the flow path 25 for charged particles as objects to be detected between the first electrode 21 and the second electrodes 22, the detection electrodes (third electrodes) 26 arranged on the downstream side in the flow path 25 with respect to the first electrode 21 and the second electrodes 22 and configured to collect the charged particles, and the power supply electrode (fourth electrode) 28 connected to the second electrodes 22 and having the sheet resistance higher than the sheet resistances of the second electrodes 22, in which the power supply electrode 28 extends along the third direction intersecting the first direction that is the direction in which the charged particles flow in the flow path 25 and orthogonal to the second direction that is the direction from the first electrode 21 to the second electrodes 22, the power supply electrode 28 includes the one end portion 28a having the first potential $V_{cmax}$ in the third direction and the other end portion 28B having the second potential $V_{cmin}$ lower than the first potential $V_{cmax}$ in the third direction, the second electrodes 22 include the first filter electrode (fifth electrode) 22A and the second filter electrode (sixth electrode) 22B spaced apart in the third direction, the first filter electrode 22A is connected to the power supply electrode 28 at the position closer to the one end portion 28a than the other end portion 28β, the second filter electrode 22B is connected to the power supply electrode 28 at the position closer to the other end portion 28β than the connection position of the first filter electrode 22A, the detection electrodes 26 include the first detection electrode (seventh electrode) 26A and the second detection electrode (eighth electrode) 26B spaced apart in the third direction, the first detection electrode 26A is arranged side by side with the first filter electrode 22A along the first direction, and the second detection electrode 26B is arranged side by side with the second filter electrode 22B along the first direction.

The electrical fields generated between the first electrode 21 and the second electrodes 22 control whether or not charged particles pass through the flow path 25 formed between the first electrode 21 and the second electrodes 22. The charged particles passing through the flow path 25 are collected and detected by the detection electrodes 26 arranged downstream of the flow path 25 with respect to the first electrode 21 and the second electrodes 22. The potentials are supplied to the second electrodes 22 by the power supply electrode 28 connected thereto. Since the power supply electrode 28 has a sheet resistance higher than the sheet resistances of the second electrodes 22, the connection positions of the first filter electrode 22A and the second filter electrode 22B included in the second electrodes 22 are different in the third direction, so that the potentials supplied to the first filter electrode 22A and the second filter electrode 22B are different. To be specific, since the first filter electrode 22A is connected to the power supply electrode 28 at the position closer to the one end portion 28a than the other end portion 28B in the third direction, the first filter electrode 22A has a potential closer to the first potential $V_{cmax}$ than the second potential $V_{cmin}$ or the same potential as the first potential $V_{cmax}$. Since the second filter electrode 22B is connected to the power supply electrode 28 at a position closer to the other end portion 28β than the connection position of the first filter electrode 22A in the third direction, the second filter electrode 22B has a potential lower than the potential of the first filter electrode 22A. Since the first detection electrode 26A included in the detection electrodes 26 is arranged side by side with the first filter electrode 22A along the first direction, the charged particles filtered by the first filter electrode 22A having the potential described above can be collected. Since the second detection electrode 26B included in the detection electrodes 26 is arranged side by side with the second filter electrode 22B along the first direction, the charged particles filtered by the second filter electrode 22B having the potential described above can be collected.

Here, the second electrodes 22 have sheet resistances lower than the sheet resistance of the power supply electrode 28. Thus, the potential of the first filter electrode 22A is constant within the span of the first filter electrode 22A, and the potential of the second filter electrode 22B is constant within the span of the second filter electrode 22B. That is, since the potentials of the first filter electrode 22A and the second filter electrode 22B do not change according to the positions in the third direction as in the related art, resolution of the detection results based on the charged particles collected by the first detection electrode 26A and the second detection electrode 26B can be higher than in the related art. Since the first potential $V_{cmax}$ and the second potential $V_{cmin}$ only need to be supplied to the one end portion 28a and the other end portion 28β of the power supply electrode 28 in the third direction, respectively, the circuit for supplying potentials to the second electrodes 22 can be made simpler than known circuits.

The power supply electrode 28 overlaps the first filter electrode 22A and the second filter electrode 22B on the side opposite to the first electrode 21 side. As compared with a case in which the power supply electrode 28 is arranged so as not to overlap the first filter electrode 22A and the second filter electrode 22B, space efficiency of the detection cell 20 is improved, which is suitable for downsizing the detection cell 20.

The power supply electrode 28 extends along the first direction over the entire lengths of the first filter electrode 22A and the second filter electrode 22B, and is in contact with the surfaces of the first filter electrode 22A and the second filter electrode 22B facing the power supply electrode 28 over the entire lengths in the first direction. In each of the first filter electrode 22A and the second filter electrode 22B, potential distribution in the first direction is made uniform. This improves a capture rate of charged particles. Since the power supply electrode 28 is in direct contact with the first filter electrode 22A and the second filter electrode 22B, wiring lines or the like for connecting the power supply electrode 28 to the first filter electrode 22A and the second filter electrode 22B are not required.

The power supply electrode 28 is in contact with the entire surfaces of the first filter electrode 22A and the second filter electrode 22B facing the power supply electrode 28. As compared with a case in which parts of the surfaces of the first filter electrode 22A and the second filter electrode 22B facing the power supply electrode 28 are in contact with the power supply electrode 28, connection reliability between the power supply electrode 28 and the first filter electrode 22A and the second filter electrode 22B is improved, and steps are less likely to occur on the surfaces of the first filter electrode 22A and the second filter electrode 22B. A manufacturing process is simplified as compared with a case in which an insulating film is sandwiched between the power supply electrode 28 and the first filter electrode 22A and the second filter electrode 22B.

The first filter electrode 22A and the first detection electrode 26A have the same dimension in the third direction and have the same center in the third direction, and the second filter electrode 22B and the second detection electrode 26B have the same dimension in the third direction and have the same center in the third direction. The charged particles filtered by the first filter electrode 22A can be efficiently captured by the first detection electrode 26A. The charged particles filtered by the second filter electrode 22B can be efficiently captured by the second detection electrode 26B. This improves a capture rate of charged particles.

Second Embodiment

A second embodiment will be described with reference to FIG. 11 to FIG. 14. In the second embodiment, an insulating film 29 is provided between second electrodes 122 and a power supply electrode 128. Further, repetitive descriptions of structures, actions, and effects similar to those of the first embodiment described above will be omitted.

Figure 11:
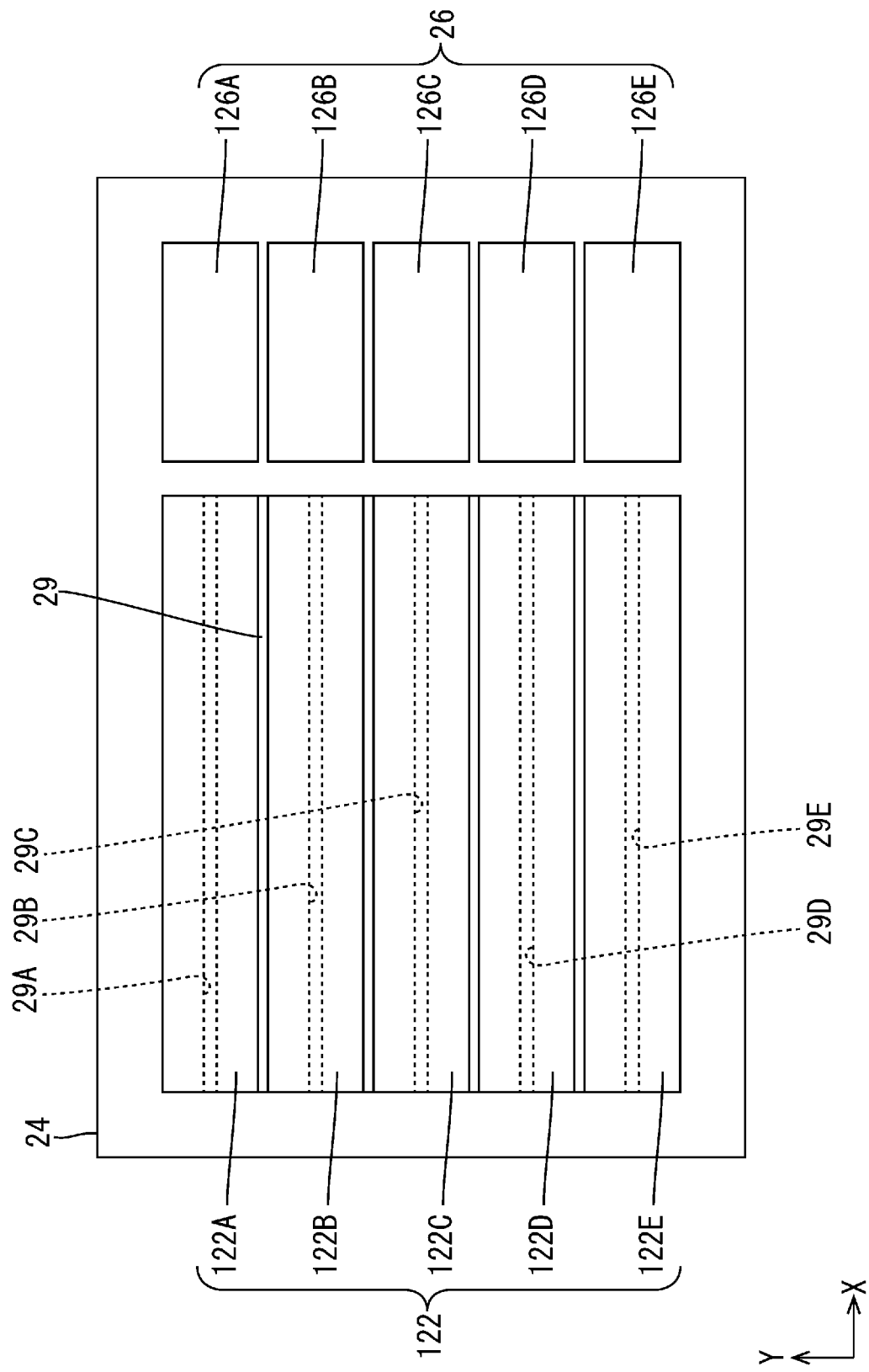
FIG. 11 is a plan view of a second substrate included in a detection cell according to a second embodiment.
Figure 12:
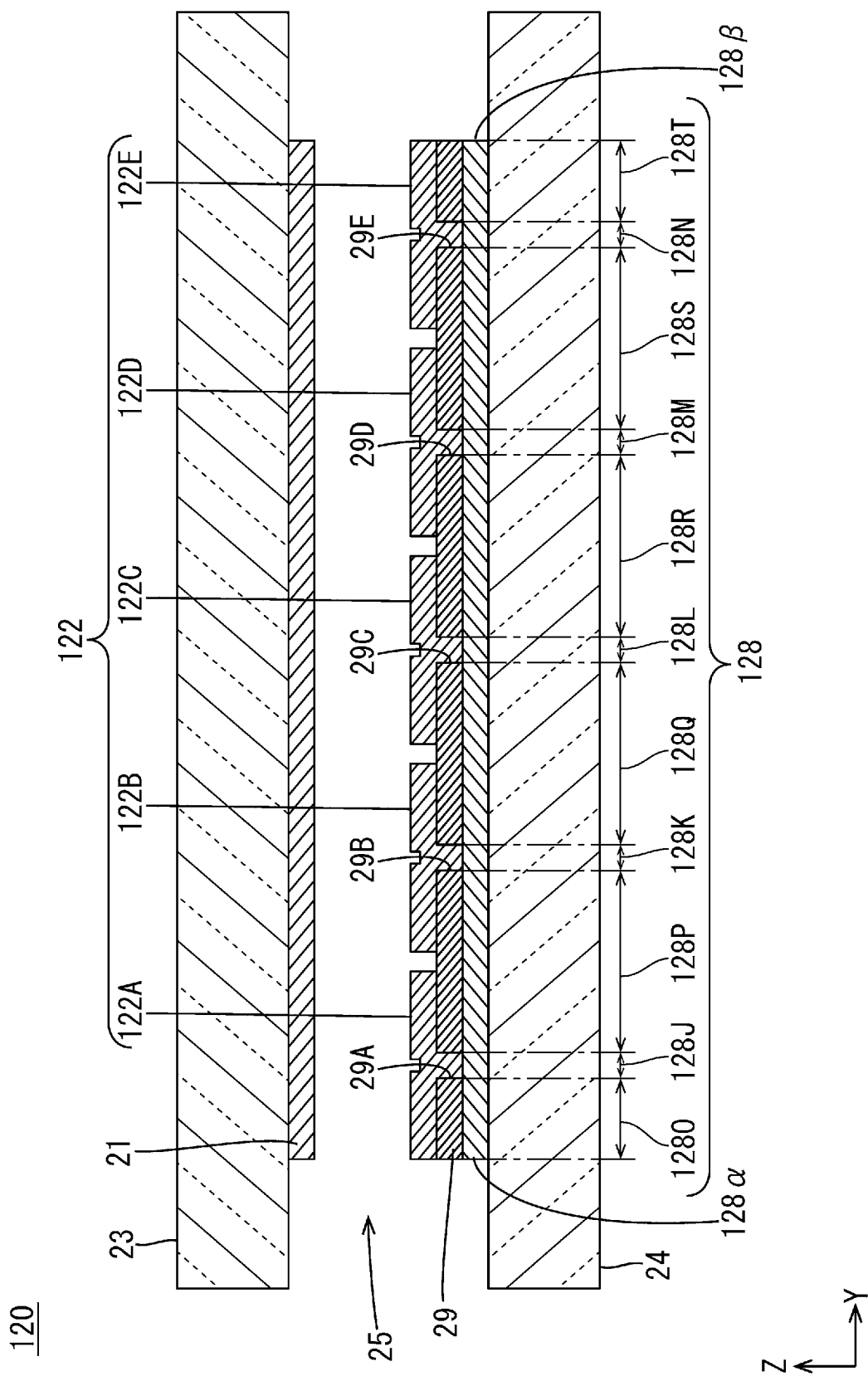
FIG. 12 is a cross-sectional view of the detection cell according to the second embodiment cut at the same cutting position as in FIG. 7.

As illustrated in FIGS. 11 and 12, a second substrate 124 included in a detection cell 120 according to the present embodiment is provided with the insulating film 29. The insulating film 29 is placed to be sandwiched between the second electrodes 122 and the power supply electrode 128 in a Z-axis direction. In detail, the insulating film 29 overlaps the power supply electrode 128 on a first filter electrode 121 side (a side opposite to a second substrate 124 side) in the Z-axis direction, and overlaps the second electrodes 122 on a side opposite to a first electrode 121 side (the second substrate 124 side) in the Z-axis direction. The insulating film 29 is arranged so as to cover substantially an entire area of the power supply electrode 128 in an X-axis direction and a Y-axis direction. The insulating film 29 is made of an inorganic material such as SiN, $SiO_2$, or SiON, and may be a single-layer film or a layered film. A thickness of the insulating film 29 is, for example, in a range of 100 nm to 900 nm. In order to sufficiently ensure insulating properties of the insulating film 29, the thickness of the insulating film 29 is preferably 500 nm or more.

The insulating film 29 has openings 29A to 29E for individually connecting the power supply electrode 128 to filter electrodes 122A to 122E. In detail, the insulating film 29 has the first opening 29A disposed at a position overlapping part of the first filter electrode 122A, the second opening 29B disposed at a position overlapping part of the second filter electrode 122B, the third opening 29C disposed at a position overlapping part of the third filter electrode 122C, the fourth opening 29D disposed at a position overlapping part of the fourth filter electrode 122D, and the fifth opening 29E disposed at a position overlapping part of the fifth filter electrode 122E. Part of the first filter electrode 122A is connected to the power supply electrode 128 through the first opening 29A. Part of the second filter electrode 122B is connected to the power supply electrode 128 through the second opening 29B. Part of the third filter electrode 122C is connected to the power supply electrode 128 through the third opening 29C. Part of the fourth filter electrode 122D is connected to the power supply electrode 128 through the fourth opening 29D. Part of the fifth filter electrode 122E is connected to the power supply electrode 128 through the fifth opening 29E. Thus, the multiple second electrodes 122 according to the present embodiment are connected to the power supply electrode 128 at different positions in the Y-axis direction through the multiple openings 29A to 29E.

The insulating film 29 has the openings 29A to 29E having the same centers as the filter electrodes 122A to 122E in the Y-axis direction (central positions in the Y-axis direction). Thus, central portions of the filter electrodes 122A to 122E in the Y-axis direction are selectively connected to the power supply electrode 128 through the openings 29A to 29E. The insulating film 29 has the openings 29A to 29E extending along the X-axis direction over the entire lengths of the filter electrodes 122A to 122E (the insulating film 29). Thus, the filter electrodes 122A to 122E are in contact with the power supply electrode 128 over the entire lengths in the X-axis direction through the openings 29A to 29E. In the insulating film 29, width dimensions (dimensions in the Y-axis direction) of the openings 29A to 29E are substantially constant and sufficiently smaller than width dimensions of the filter electrodes 122A to 122E. To be specific, the width dimensions of the openings 29A to 29E are, for example, in a range of 1 μm to 500 μm. In the insulating film 29, the openings 29A to 29E are arranged at substantially equal pitches in the Y-axis direction. Spaces between the openings 29A to 29E adjacent in the Y-axis direction are, for example, in a range of 10 μm to 1.5 mm. That is, the spaces between the openings 29A to 29E adjacent in the Y-axis direction may be equivalent to those in the first embodiment.

The power supply electrode 128 includes portions that overlap the openings 29A to 29E and are in direct contact with the second electrodes 122, and portions that do not overlap the openings 29A to 29E and are not in direct contact with the second electrodes 122. In the following description, in the power supply electrode 128, a portion overlapping the first opening 29A is referred to as a 6th overlapping portion 128J, a portion overlapping the second opening 29B is referred to as a 7th overlapping portion 128K, a portion overlapping the third opening 29C is referred to as an 8th overlapping portion 128L, a portion overlapping the fourth opening 29D is referred to as a 9th overlapping portion 128M, and a portion overlapping the fifth opening 29E is referred to as a 10th overlapping portion 128N. In the power supply electrode 128, a portion located on an opposite side of a second opening 29B side with respect to the first opening 29A in the Y-axis direction (upper side in FIG. 11 and left side in FIG. 12) and including one end portion 128α is referred to as a fifth non-overlapping portion 128O. In the power supply electrode 128, a portion located between the first opening 29A and the second opening 29B in the Y-axis direction is referred to as a sixth non-overlapping portion 128P, a portion located between the second opening 29B and the third opening 29C in the Y-axis direction is referred to as a seventh non-overlapping portion 128Q, a portion located between the third opening 29C and the fourth opening 29D in the Y-axis direction is referred to as an eighth non-overlapping portion 128R, and a portion located between the fourth opening 29D and the fifth opening 29E in the Y-axis direction is referred to as a ninth non-overlapping portion 128S. In the power supply electrode 128, a portion located on an opposite side of a fourth opening 29D side with respect to the fifth opening 29E in the Y-axis direction (lower side in FIG. 11 and right side in FIG. 12) and including another end portion 128β is referred to as a 10th non-overlapping portion 128T. Among the 5th non-overlapping portion 128O to the 10th non-overlapping portion 128T, the 6th non-overlapping portion 128P to the 9th non-overlapping portion 128S include portions that do not overlap the filter electrodes 122A to 122E (portions located between the filter electrodes 122A to 122E adjacent in the Y-axis direction).

Figure 13:
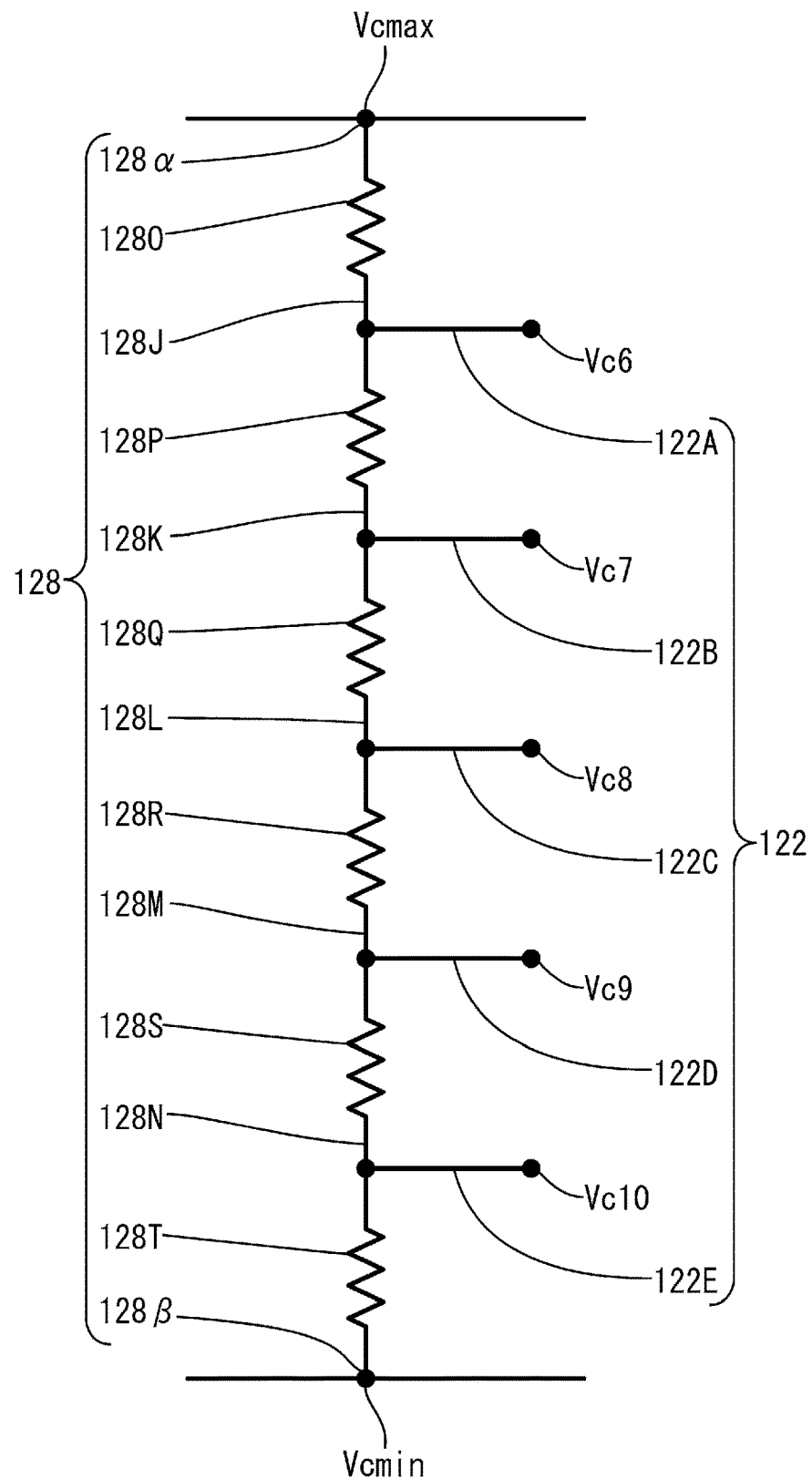
FIG. 13 is a circuit diagram of a power supply electrode and second electrodes included in the detection cell according to the second embodiment.

Potentials of the power supply electrode 128 and the filter electrodes 122A to 122E will be described with reference to FIG. 13. FIG. 13 is a circuit diagram of the power supply electrode 128 and the filter electrodes 122A to 122E. In the power supply electrode 128 having a sheet resistance higher than sheet resistances of the second electrodes 122, the non-overlapping portions 128O to 128T that do not overlap the openings 29A to 29E practically function as resistors. In the circuit diagram illustrated in FIG. 13, the non-overlapping portions 128O to 128T are illustrated as resistors. As illustrated in FIG. 13, a voltage drop corresponding to a distance between each of the openings 29A to 29E, which are connection positions of the filter electrodes 122A to 122E to the power supply electrode 128 in the Y-axis direction, and the one end portion 128a of the power supply electrode 128, which has a first potential $V_{cmax}$, occurs in a potential supplied to each of the filter electrodes 122A to 122E. To be specific, a potential $V_{c6}$ of the first filter electrode 122A is lower than the first potential $V_{cmax}$. Between the potential $V_{c6}$ of the first filter electrode 122A and the first potential $V_{cmax}$, a potential difference corresponding to a distance between the one end portion 128a and the first opening 29A (a width dimension of the fifth non-overlapping portion 128O) occurs. Between the potential $V_{c6}$ of the first filter electrode 122A and a potential $V_{c7}$ of the second filter electrode 122B, a potential difference corresponding to a distance between the first opening 29A and the second opening 29B (a dimension of the sixth non-overlapping portion 128P in the Y-axis direction) occurs. Between the potential $V_{c7}$ of the second filter electrode 122B and a potential $V_{c8}$ of the third filter electrode 122C, a potential difference corresponding to a distance between the second opening 29B and the third opening 29C (a dimension of the seventh non-overlapping portion 128Q in the Y-axis direction) occurs. Between the potential $V_{c8}$ of the third filter electrode 122C and a potential $V_{c9}$ of the fourth filter electrode 122D, a potential difference corresponding to a distance between the third opening 29C and the fourth opening 29D (a dimension of the eighth non-overlapping portion 128R in the Y-axis direction) occurs. Between the potential $V_{c9}$ of the fourth filter electrode 122D and a potential $V_{c10}$ of the fifth filter electrode 122E, a potential difference corresponding to a distance between the fourth opening 29D and the fifth opening 29E (a dimension of the ninth non-overlapping portion 128S in the Y-axis direction) occurs. The potential $V_{c10}$ of the fifth filter electrode 122E is higher than the second potential $V_{cmin}$. Between the potential $V_{c10}$ of the fifth filter electrode 122E and the second potential $V_{cmin}$, a potential difference corresponding to a distance between the other end portion 128β and the fifth opening 29E (a width dimension of the 10th non-overlapping portion 128T) occurs. In the present embodiment, since the distances between the openings 29A to 29E adjacent in the Y-axis direction are all equal, the potential differences generated between the filter electrodes 122A to 122E adjacent in the Y-axis direction are also equal.

As described above, the potentials $V_{c6}$ to $V_{c10}$ of the filter electrodes 122A to 122E depend on the positions of the openings 29A to 29E in the insulating film 29 in the Y-axis direction, and are independent of the positions and width dimensions of the filter electrodes 122A to 122E in the Y-axis direction. Thus, design flexibility regarding the positions and width dimensions of the filter electrodes 122A to 122E in the Y-axis direction is increased. Taking advantage of this, in the present embodiment, the width dimensions of the filter electrodes 122A to 122E are larger than the width dimensions of the filter electrodes 22A to 22E described in the first embodiment. Accordingly, spaces between the filter electrodes 122A to 122E adjacent in the Y-axis direction are smaller than the spaces between the filter electrodes 22A to 22E adjacent in the Y-axis direction described in the first embodiment (FIG. 5), and are smaller than the width dimensions of the openings 29A to 29E. When the spaces between the filter electrodes 122A to 122E adjacent in the Y-axis direction are set to be as narrow as possible in this way, an amount of charged particles not captured by the filter electrodes 122A to 122E can be reduced. As a result, a capture rate of charged particles by the filter electrodes 122A to 122E can be improved. The overlapping portions 128J to 128N of the power supply electrode 128 overlapping the openings 29A to 29E are in contact with surfaces of the filter electrodes 122A to 122E facing the power supply electrode 128 over the entire length in the X-axis direction. With this configuration, in each of the filter electrodes 122A to 122E, a potential distribution in the X-axis direction is made uniform. This can further improve the capture rate of charged particles by the filter electrodes 122A to 122E. Width dimensions of detection electrodes 126A to 126E are the same as the width dimensions of the filter electrodes 122A to 122E aligned along the X-axis direction. Width dimensions of deflection electrodes 27A to 27E are the same as the width dimensions of the detection electrodes 126A to 126E facing the deflection electrodes 27A to 27E, respectively.

Figure 14:
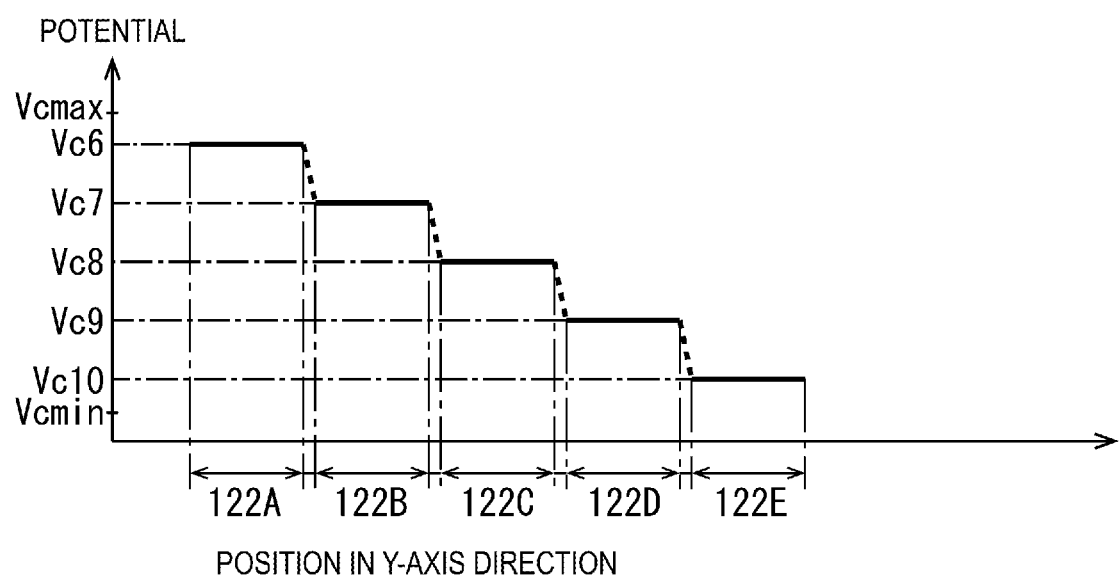
FIG. 14 is a graph conceptually showing a relationship between positions of the second electrodes in a Y-axis direction and potentials of the second electrodes according to the second embodiment.

FIG. 14 is a graph conceptually showing a relationship between the positions of the filter electrodes 122A to 122E in the Y-axis direction and the potentials $V_{c6}$ to $V_{c10}$ of the filter electrodes 122A to 122E. In FIG. 14, a vertical axis represents the potentials $V_{c6}$ to $V_{c10}$ of the filter electrodes 122A to 122E, and a horizontal axis represents the positions of the filter electrodes 122A to 122E in the Y-axis direction. The horizontal axis of FIG. 14 indicates spans of the filter electrodes 122A to 122E in the Y-axis direction. Between the filter electrodes 122A to 122E adjacent in the Y-axis direction on the horizontal axis in FIG. 14, portions of the sixth non-overlapping portion 128P to the ninth non-overlapping portion 128S (portions not overlapping the filter electrodes 122A to 122E) are present. As shown in FIG. 14, the potentials are, in descending order, the potential $V_{c6}$ of the first filter electrode 122A, the potential $V_{c7}$ of the second filter electrode 122B, the potential $V_{c8}$ of the third filter electrode 122C, the potential $V_{c9}$ of the fourth filter electrode 122D, and the potential $V_{c10}$ of the fifth filter electrode 122E. The potential $V_{c6}$ of the first filter electrode 122A is lower than the first potential $V_{cmax}$. The potential $V_{c10}$ of the fifth filter electrode 122E is higher than the second potential $V_{cmin}$. The potentials $V_{c6}$ to $V_{c10}$ of the filter electrodes 122A to 122E are constant in the spans of the filter electrodes 122A to 122E in the Y-axis direction. Since the filter electrodes 122A to 122E are wider than those in the first embodiment, the spans in which the potentials $V_{c6}$ to $V_{c10}$ are constant in the Y-axis direction are also wider. Forming the openings 122A to 122E, which are contact points between the filter electrodes 29A to 29E and the power supply electrode 128, extending along the X-axis direction over the entire length of the power supply electrode 128 also contributes to keeping the potentials $V_{c6}$ to $V_{c10}$ of the filter electrodes 122A to 122E constant.

As described above, according to the present embodiment, the detection cell 120 includes the insulating film 29 sandwiched between the power supply electrode 128 and the first filter electrode 122A and between the power supply electrode 128 and the second filter electrode 122B, in which the insulating film 29 has the first opening 29A arranged at the position overlapping the part of the first filter electrode 122A and the second opening 29B arranged at the position overlapping the part of the second filter electrode 122B. The part of the first filter electrode 122A is connected to the power supply electrode 128 through the first opening 29A, and the part of the second filter electrode 122B is connected to the power supply electrode 128 through the second opening 29B. The potential difference is generated between the first filter electrode 122A and the second filter electrode 122B in accordance with the distance between the first opening 29A and the second opening 29B. When the power supply electrode 128 is in direct contact with the entire surfaces of the first filter electrode 122A and the second filter electrode 122B facing the power supply electrode 128, a space between the first filter electrode 122A and the second filter electrode 122B is determined according to a potential difference to be generated between the first filter electrode 122A and the second filter electrode 122B. In this regard, when a distance between the first opening 29A and the second opening 29B is set according to the potential difference to be generated between the first filter electrode 122A and the second filter electrode 122B, the space between the first filter electrode 122A and the second filter electrode 122B can be set freely. Thus, the space between the first filter electrode 122A and the second filter electrode 122B can be made as narrow as possible, which is suitable for improving a capture rate of charged particles. Since the power supply electrode 128 is in direct contact with the first filter electrode 122A and the second filter electrode 122B, wiring lines or the like for connecting the power supply electrode 128 to the first filter electrode 122A and the second filter electrode 122B are not required.

The power supply electrode 128 extends along the first direction over the entire lengths of the first filter electrode 122A and the second filter electrode 122B. The insulating film 29 has the first opening 29A and the second opening 29B extending along the first direction over the entire lengths of the first filter electrode 122A and the second filter electrode 122B. With this configuration, the power supply electrode 128 is in contact with the surfaces of the first filter electrode 122A and the second filter electrode 122B facing the power supply electrode 128 over the entire length in the first direction. Thus, in each of the first filter electrode 122A and the second filter electrode 122B, potential distribution in the first direction is made uniform. This further improves the capture rate of charged particles.

Other Embodiments

The techniques disclosed in the present specification are not limited to the embodiments described above and illustrated in the drawings, and the following embodiments, for example, are also included within the technical scope.

(1) The dimensions of the power supply electrodes 28 and 128 in the X-axis direction may be smaller than the dimensions of the second electrodes 22 and 122 (the filter electrodes 22A to 22E and 122A to 122E) in the X-axis direction. For example, the power supply electrodes 28 and 128 may have an elongated band shape extending along the Y-axis direction and may be arranged so as to partially overlap the second electrodes 22 and 122 (the filter electrodes 22A to 22E and 122A to 122E) in the X-axis direction.

(2) The power supply electrodes 28 and 128 may be arranged so as not to overlap the second electrodes 22 and 122 (the filter electrodes 22A to 22E and 122A to 122E). In this case, wiring lines or the like may be provided to connect the power supply electrodes 28 and 128 to the second electrodes 22 and 122 (the filter electrodes 22A to 22E and 122A to 122E).

(3) In (1) or (2) described above, the power supply electrodes 28 and 128 may extend along a direction that intersects the X-axis direction without being orthogonal thereto (an oblique direction with respect to the Y-axis direction).

(4) In the configuration described in the first embodiment, the first overlapping portion 28A does not have to include the one end portions 28a of the power supply electrode 28 in the Y-axis direction. Similarly, the fifth overlapping portion 28E does not have to include the other end portions 28β of the power supply electrode 28 in the Y-axis direction.

(5) In the configuration described in the second embodiment, specific arrangement of the openings 29A to 29E in the insulating film 29 in the Y-axis direction can be changed as appropriate. For example, the openings 29A to 29E may be offset from the central positions of the filter electrodes 122A to 122E that overlap the openings 29A to 29E in the Y-axis direction. At this time, the first opening 29A can be arranged so as to overlap the one end portion 128a of the power supply electrode 128 in the Y-axis direction. In this case, the potential $V_{c6}$ of the first filter electrode 122A is equal to the first potential. Similarly, the fifth opening 29E can be arranged so as to overlap the other end portion 128β of the power supply electrode 128 in the Y-axis direction. In this case, the potential $V_{c10}$ of the fifth filter electrode 122E is equal to the second potential. The openings 29A to 29E may be arranged at unequal pitches in the Y-axis direction.

(6) In the configuration described in the second embodiment, the dimensions of the openings 29A to 29E in the insulating film 29 in the X-axis direction may be smaller than the dimensions of the filter electrodes 122A to 122E in the X-axis direction. In that case, for example, multiple openings (any of multiple openings 29A to 29E) can overlap one filter electrode (any of multiple electrodes 122A to 122E) side by side along the X-axis direction.

(7) In the configuration described in the second embodiment, multiple openings (any of multiple openings 29A to 29E) can also overlap one filter electrode (any of multiple electrodes 122A to 122E) side by side along the Y-axis direction. This configuration can be combined with (6) described above.

(8) In the configuration described in the second embodiment, the spaces between the filter electrodes 122A to 122E adjacent in the Y-axis direction may be equal to or larger than the width dimensions of the openings 29A to 29E. The spaces between the filter electrodes 122A to 122E adjacent in the Y-axis direction may be equivalent to the spaces between the filter electrodes 22A to 22E adjacent in the Y-axis direction described in the first embodiment.

(9) In the configuration described in the second embodiment, the material of the insulating film 29 may be an organic material or the like.

(10) In the configuration described in the second embodiment, the numerical range of the thickness of the insulating film 29 can be changed as appropriate.

(11) The numbers of second electrodes 22 and 122 (filter electrodes 22A to 22E, and 122A to 122E) to be provided can be appropriately changed to a number other than five as long as the number is two or more. Similarly, the numbers of the detection electrodes 26 and the deflection electrodes 27 to be provided can be appropriately changed to a number other than five as long as the numbers are two or more.

(12) The filter electrodes 22A to 22E and 122A to 122E may be arranged at unequal pitches in the Y-axis direction.

(13) The width dimensions of the filter electrodes 22A to 22E and 122A to 122E may be irregular.

(14) The dimensions of the filter electrodes 22A to 22E and 122A to 122E in the Y-axis direction may be different from the dimensions of the detection electrodes 26A to 26E and 126A to 126E arranged side by side with the filter electrodes 22A to 22E and 122A to 122E along the X-axis direction. The detection electrodes 26A to 26E and 126A to 126E may be wider than the filter electrodes 22A to 22E and 122A to 122E, but conversely may be narrower than the filter electrodes 22A to 22E and 122A to 122E.

(15) The numerical ranges of the spaces between the filter electrodes 22A to 22E and 122A to 122E adjacent in the Y-axis direction can be changed as appropriate. In particular, in the configuration described in the first embodiment, the numerical ranges can be appropriately adjusted in accordance with the values of the sheet resistances of the second electrodes 22 and the power supply electrode 28.

(16) The numerical ranges of the film thicknesses of the first electrode 21 and the second electrodes 22 and 122 can be changed as appropriate.

(17) The second electrodes 22 and 122, the power supply electrodes 28 and 128, the deflection electrodes 27, and the like may be provided on the first substrate 23, and the first electrode 21, the detection electrodes 26, and the like may be provided on the second substrate 24.

(18) Both the dispersion voltage DV and the compensation voltage CV may be applied to the second electrodes 22 and 122. In that case, electrodes and wiring lines for supplying the dispersion voltage DV to the filter electrodes 22A to 22E and 122A to 122E constituting the second electrodes 22 and 122 can be provided separately from the power supply electrodes 28 and 128. The first electrode 21 may be grounded or the like.

(19) The compensation voltage CV can be applied to the first electrode 21 and the dispersion voltage DV can be applied to the second electrodes 22 and 122.

(20) The detector may include a part or all of the control unit 40 in addition to the detection cells 20 and 120.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A detector comprising:
a first electrode;
second electrodes facing the first electrode with a space and forming a flow path for charged particles as objects to be detected between the first electrode and the second electrodes;
third electrodes arranged on a downstream side in the flow path with respect to the first electrode and the second electrodes and configured to collect the charged particles; and
a fourth electrode connected to the second electrodes and having a sheet resistance higher than sheet resistances of the second electrodes,
wherein the fourth electrode extends along a third direction intersecting a first direction that is a direction in which the charged particles flow in the flow path and orthogonal to a second direction that is a direction from the first electrode to the second electrodes, the fourth electrode includes one end portion having a first potential in the third direction and another end portion having a second potential lower than the first potential in the third direction, the second electrodes include a fifth electrode and a sixth electrode spaced apart in the third direction, the fifth electrode is connected to the fourth electrode at a position closer to the one end portion than the other end portion, the sixth electrode is connected to the fourth electrode at a position closer to the other end portion than a connection position of the fifth electrode, the third electrodes include a seventh electrode and an eighth electrode spaced apart in the third direction, the seventh electrode is arranged side by side with the fifth electrode along the first direction, and the eighth electrode is arranged side by side with the sixth electrode along the first direction.

2. The detector according to claim 1, wherein the fourth electrode overlaps the fifth electrode and the sixth electrode on a side opposite to a first electrode side.

3. The detector according to claim 2, wherein the fourth electrode extends along the first direction, is provided over entire lengths of the fifth electrode and the sixth electrode, and is in contact with surfaces of the fifth electrode and the sixth electrode facing the fourth electrode over entire lengths in the first direction.

4. The detector according to claim 3, wherein the fourth electrode is in contact with entire surfaces of the fifth electrode and the sixth electrode facing the fourth electrode.

5. The detector according to claim 2 comprising:

an insulating film sandwiched between the fourth electrode and the fifth electrode and between the fourth electrode and the sixth electrode, wherein the insulating film has a first opening arranged at a position overlapping part of the fifth electrode and a second opening arranged at a position overlapping part of the sixth electrode.

6. The detector according to claim 5, wherein the fourth electrode extends along the first direction over entire lengths of the fifth electrode and the sixth electrode, and the insulating film has the first opening and the second opening extending along the first direction over the entire lengths of the fifth electrode and the sixth electrode.

7. The detector according to claim 1, wherein the fifth electrode and the seventh electrode have a same dimension in the third direction and have a same center in the third direction, and the sixth electrode and the eighth electrode have a same dimension in the third direction and have a same center in the third direction.

\* \* \* \* \*